US012463371B2

(12) United States Patent
Carbaugh et al.

(10) Patent No.: US 12,463,371 B2
(45) Date of Patent: Nov. 4, 2025

(54) ROBUST HIGH SPEED, HIGH DENSITY CONNECTOR

(71) Applicant: FCI USA LLC, Etters, PA (US)

(72) Inventors: Scott Carbaugh, Orbisonia, PA (US); Mark R. Gray, York, PA (US); James J. Muha, Boiling Springs, PA (US)

(73) Assignee: FCI USA LLC, Etters, PA (US)

( * ) Notice: Subject to any disclaimer, the term of this patent is extended or adjusted under 35 U.S.C. 154(b) by 605 days.

(21) Appl. No.: 17/868,165

(22) Filed: Jul. 19, 2022

(65) Prior Publication Data

US 2023/0026708 A1 Jan. 26, 2023

Related U.S. Application Data

(60) Provisional application No. 63/224,819, filed on Jul. 22, 2021.

(51) Int. Cl.

*H01R 13/514* (2006.01)
*H01R 12/72* (2011.01)
*H01R 13/6585* (2011.01)
*H01R 43/20* (2006.01)

(52) U.S. Cl.

CPC ......... *H01R 13/514* (2013.01); *H01R 12/724* (2013.01); *H01R 13/6585* (2013.01); *H01R 43/20* (2013.01)

(58) Field of Classification Search

CPC ................ H01R 13/514; H01R 12/724; H01R 13/6585; H01R 43/20
USPC ........................................................... 439/40
See application file for complete search history.

(56) References Cited

U.S. PATENT DOCUMENTS

| | | | | |
|---|---|---|---|---|
| 6,666,720 | B1 * | 12/2003 | Reisinger ........... | H01R 13/6594 439/607.17 |
| 7,309,257 | B1 | 12/2007 | Minich | |
| 7,806,729 | B2 | 10/2010 | Nguyen et al. | |
| 8,182,289 | B2 | 5/2012 | Stokoe et al. | |
| 8,550,861 | B2 | 10/2013 | Cohen et al. | |

(Continued)

OTHER PUBLICATIONS

International Search Report and Written Opinion mailed May 17, 2021 in connection with International Application No. PCT/US2021/015073.

(Continued)

*Primary Examiner* — Tulsidas C Patel
*Assistant Examiner* — Thaslimur Rahman
(74) *Attorney, Agent, or Firm* — Wolf, Greenfield & Sacks, P.C.

(57) ABSTRACT

A direct mate orthogonal connector for a high density of high speed signals. The connector may include right angle leadframe assemblies with signal conductive elements and ground shields held by a leadframe housing. The leadframe assemblies may each have signal mating ends extending from the signal conductive elements and ground mating ends extending from the ground shield. High frequency performance may be achieved with features on the leadframe housing and on the ground shield. The features may be simple to form yet ensure the positional relationship between the contacts points of the ground mating ends and (Continued)

the contact points of the signal mating ends to sustain forces generated during operating the connector to mate with another connector and/or mount to a board.

20 Claims, 21 Drawing Sheets

(56) References Cited

U.S. PATENT DOCUMENTS

| | | | | |
|---|---|---|---|---|
| 8,888,529 | B2 * | 11/2014 | Buck .................. | H01R 13/6461 439/607.05 |
| 9,065,230 | B2 | 6/2015 | Milbrand, Jr. | |
| 9,225,083 | B2 | 12/2015 | Krenceski et al. | |
| 9,257,778 | B2 | 2/2016 | Buck et al. | |
| 9,831,588 | B2 | 11/2017 | Cohen | |
| 9,923,309 | B1 | 3/2018 | Aizawa et al. | |
| 9,985,389 | B1 | 5/2018 | Morgan et al. | |
| 10,038,284 | B2 | 7/2018 | Krenceski et al. | |
| 10,096,921 | B2 | 10/2018 | Johnescu et al. | |
| 10,148,025 | B1 | 12/2018 | Trout et al. | |
| 10,355,416 | B1 | 7/2019 | Pickel et al. | |
| 10,446,983 | B2 | 10/2019 | Krenceski et al. | |
| 10,574,002 | B1 * | 2/2020 | Henry .................. | H01R 13/405 |
| 10,965,063 | B2 | 3/2021 | Krenceski et al. | |
| 11,469,553 | B2 | 10/2022 | Johnescu et al. | |
| 11,469,554 | B2 | 10/2022 | Ellison et al. | |
| 2003/0162441 | A1 | 8/2003 | Nelson et al. | |
| 2004/0224559 | A1 | 11/2004 | Nelson et al. | |
| 2006/0068640 | A1 | 3/2006 | Gailus | |
| 2006/0110977 | A1 | 5/2006 | Matthews | |
| 2008/0248659 | A1 | 10/2008 | Cohen et al. | |
| 2009/0124101 | A1 | 5/2009 | Minich et al. | |
| 2009/0203259 | A1 | 8/2009 | Nguyen et al. | |
| 2010/0197149 | A1 | 8/2010 | Davis et al. | |
| 2010/0221959 | A1 | 9/2010 | Pan | |
| 2011/0067237 | A1 | 3/2011 | Cohen et al. | |
| 2016/0134057 | A1 | 5/2016 | Buck et al. | |
| 2018/0109043 | A1 * | 4/2018 | Provencher .......... | H01R 13/025 |
| 2019/0036256 | A1 | 1/2019 | Martens et al. | |
| 2020/0251841 | A1 | 8/2020 | Stokoe et al. | |
| 2021/0234314 | A1 | 7/2021 | Johnescu et al. | |
| 2021/0234315 | A1 | 7/2021 | Ellison et al. | |
| 2022/0407269 | A1 | 12/2022 | Ellison et al. | |
| 2023/0062661 | A1 | 3/2023 | Johnescu et al. | |

OTHER PUBLICATIONS

International Search Report and Written Opinion mailed May 17, 2021 in connection with International Application No. PCT/US2021/015178.

International Search Report and Written Opinion mailed Jul. 1, 2021 in connection with International Application No. PCT/US2021/015048.

International Preliminary Report on Patentability Chapter II mailed Apr. 1, 2022 in connection with International Application No. PCT/US2021/015073.

International Preliminary Report on Patentability Chapter II mailed Apr. 5, 2022 in connection with International Application No. PCT/US2021/015048.

International Preliminary Report on Patentability mailed Aug. 11, 2022 in connection with International Application No. PCT/US2021/015178.

Ellison et al., High Speed, High Density Direct Mate Orthogonal Connector, U.S. Appl. No. 17/894,944, filed Aug. 24, 2022.

Johnescu et al., High Speed Connector, U.S. Appl. No. 17/902,342, filed Sep. 2, 2022.

Muha et al., High Speed, High Density Connector, U.S. Appl. No. 17/794,578, filed Jul. 21, 2022.

U.S. Appl. No. 17/794,578, filed Jul. 21, 2022, Muha et al.

U.S. Appl. No. 17/894,944, filed Aug. 24, 2022, Ellison et al.

U.S. Appl. No. 17/902,342, filed Sep. 2, 2022, Johnescu et al.

PCT/US2021/015048, Jul. 1, 2021, International Search Report and Written Opinion.

PCT/US2021/015048, Apr. 5, 2022, International Preliminary Report on Patentability Chapter II.

PCT/US2021/015073, May 17, 2021, International Search Report and Written Opinion.

PCT/US2021/015073, Apr. 1, 2022, International Preliminary Report on Patentability Chapter II.

PCT/US2021/015178, May 17, 2021, International Search Report and Written Opinion.

PCT/US2021/015178, Aug. 11, 2022, International Preliminary Report on Patentability.

* cited by examiner

1100

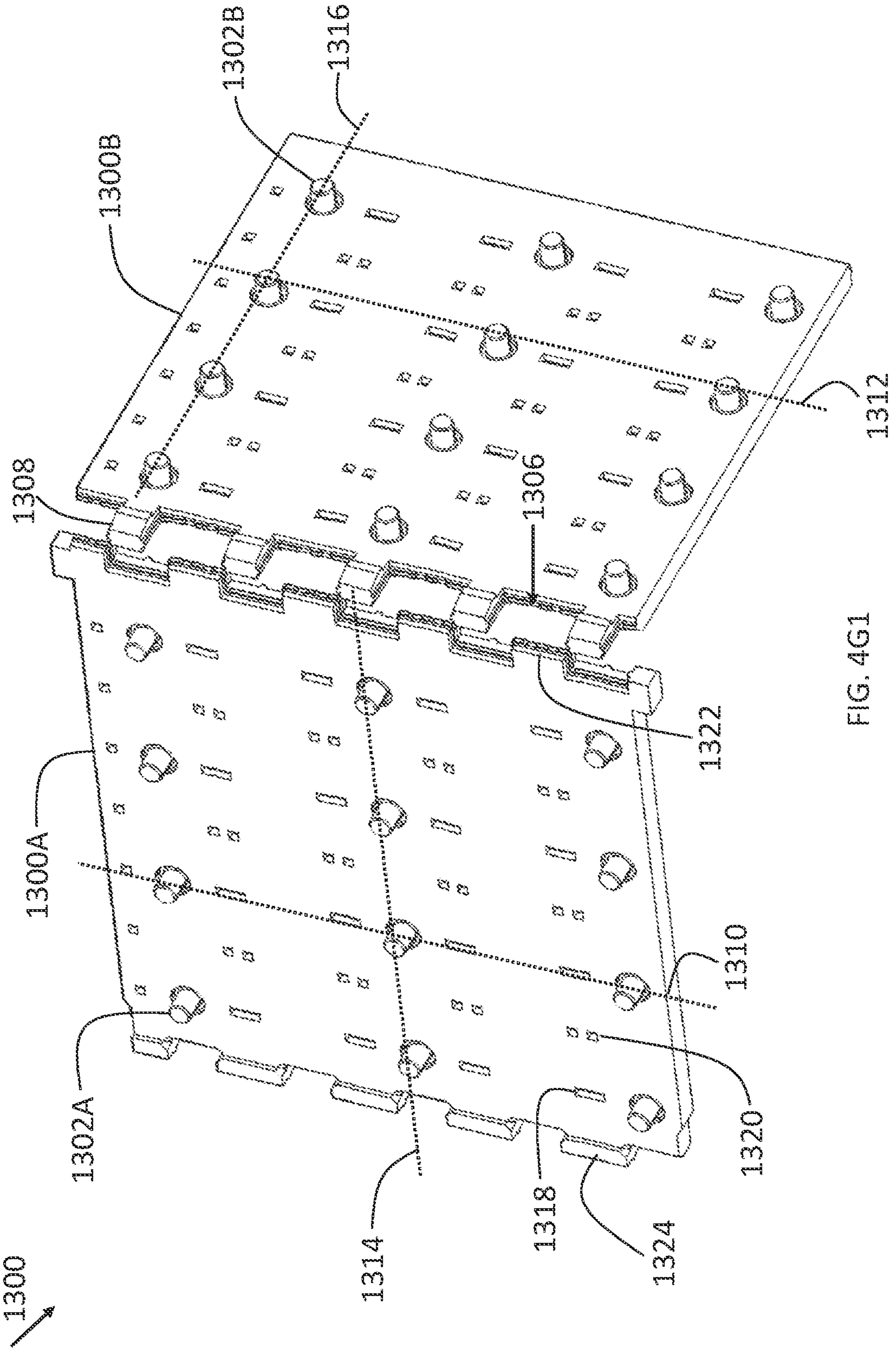
FIG. 4G1

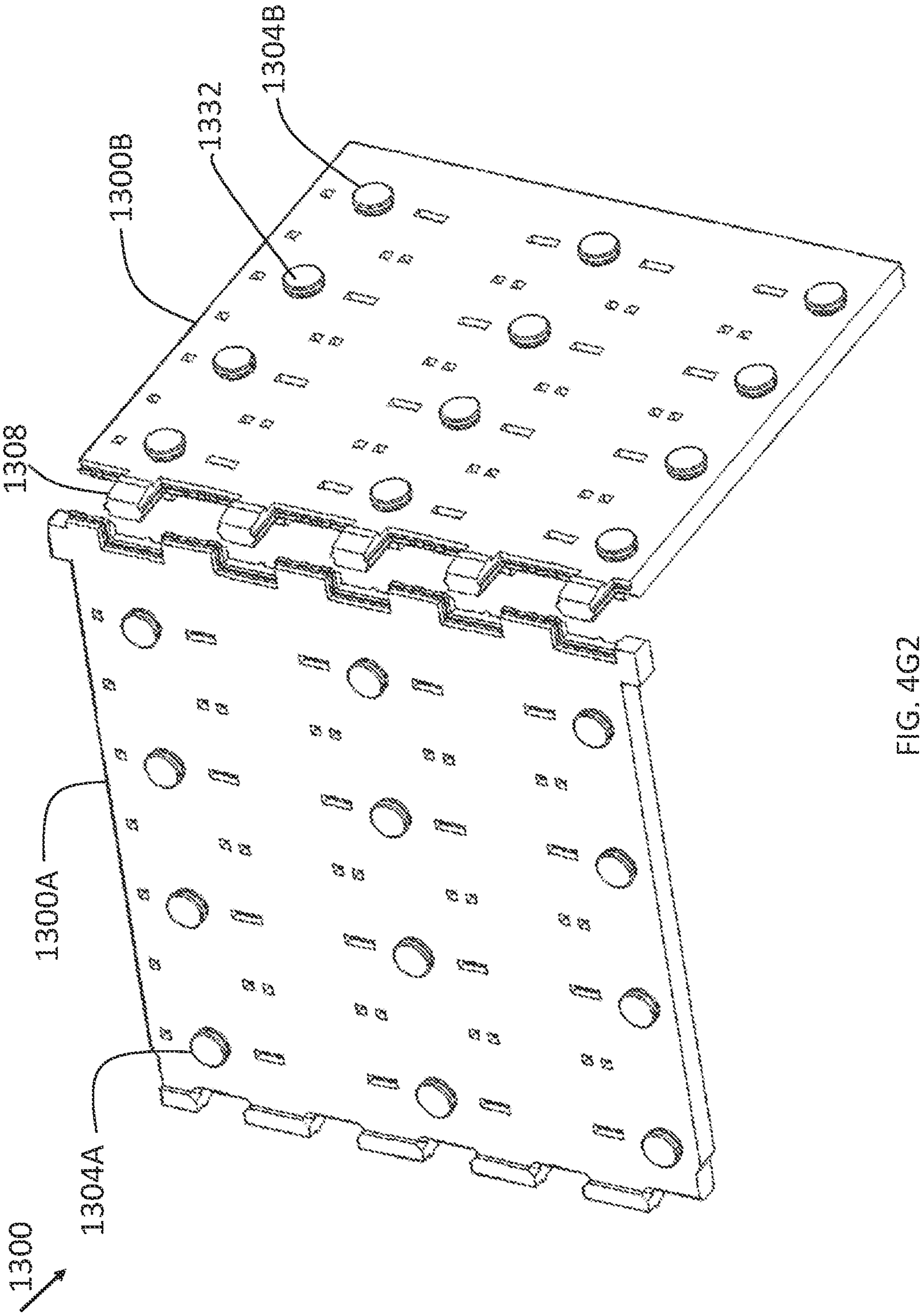
FIG. 4G2

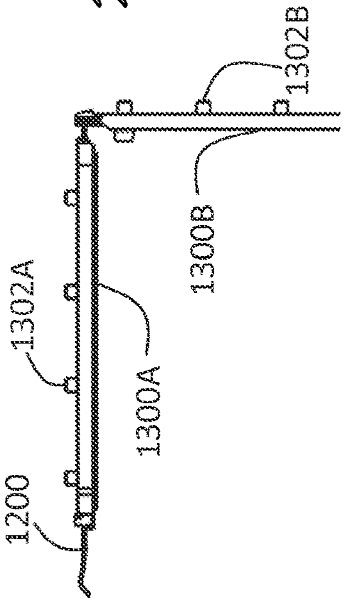
FIG. 4AA
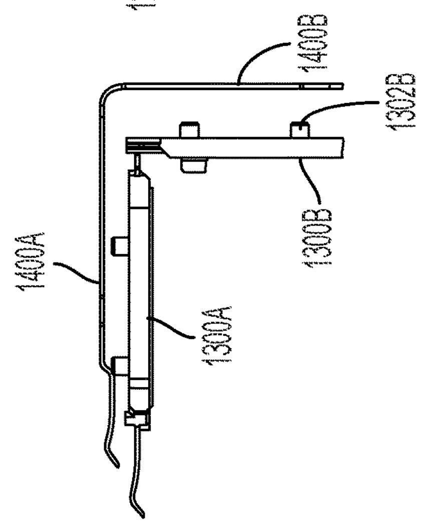
FIG. 4AB
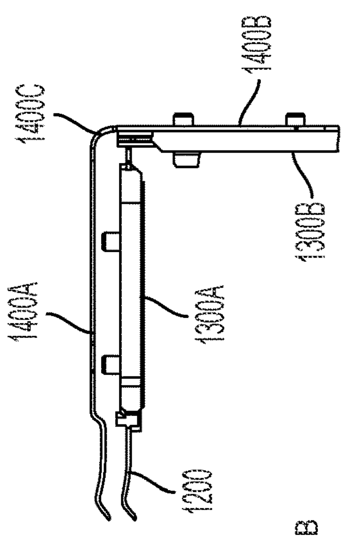
FIG. 4AC1
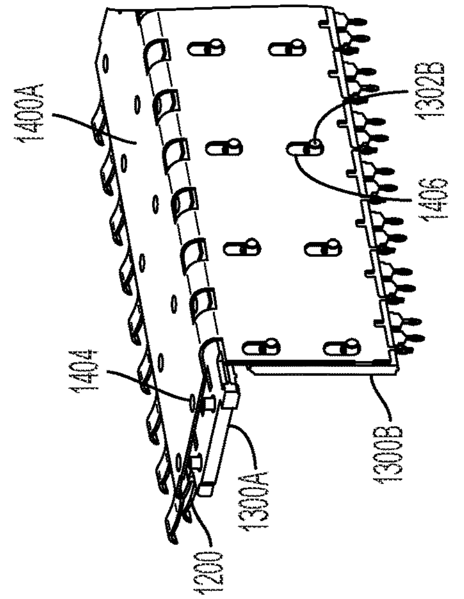
FIG. 4AC2
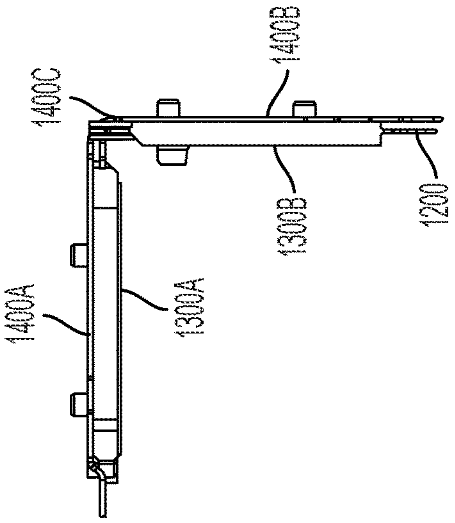
FIG. 4AD1
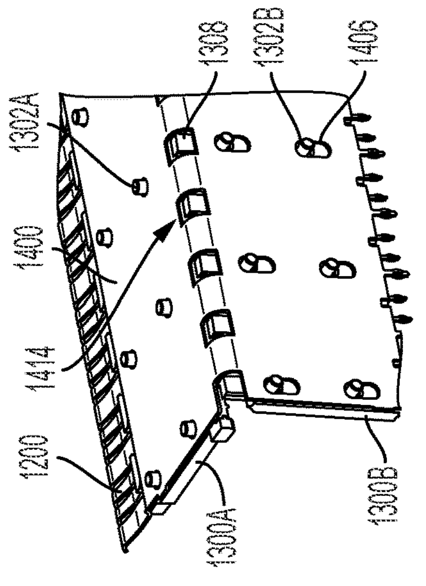
FIG. 4AD2

ROBUST HIGH SPEED, HIGH DENSITY CONNECTOR

RELATED APPLICATION

This patent application claims priority to and the benefit of U.S. Provisional Patent Application Ser. No. 63/224,819, filed on Jul. 22, 2021 and entitled "ROBUST HIGH SPEED, HIGH DENSITY CONNECTOR," the content of which is hereby incorporated herein by reference in its entirety.

FIELD

This patent application relates generally to interconnection systems, such as those including electrical connectors, used to interconnect electronic assemblies.

BACKGROUND

Electrical connectors are used in many electronic systems. It is generally easier and more cost effective to manufacture a system as separate electronic assemblies, such as printed circuit boards ("PCBs"), which may be joined together with electrical connectors. A known arrangement for joining several printed circuit boards is to have one printed circuit board serve as a backplane. Other printed circuit boards, called "daughterboards" or "daughtercards," may be connected through the backplane.

A known backplane is a printed circuit board onto which many connectors may be mounted. Conducting traces in the backplane may be electrically connected to signal conductors in the connectors so that signals may be routed between the connectors. Daughtercards may also have connectors mounted thereon. The connectors mounted on a daughtercard may be plugged into the connectors mounted on the backplane. In this way, signals may be routed among the daughtercards through the backplane. The daughtercards may plug into the backplane at a right angle. The connectors used for these applications may therefore include a right angle bend and are often called "right angle connectors."

In other system configurations, signals may be routed between parallel boards, one above the other. Connectors used in these applications are often called "stacking connectors" or "mezzanine connectors." In yet other configurations, orthogonal boards may be aligned with edges facing each other. Connectors used to connect printed circuit boards in this configuration are often called "direct mate orthogonal connectors".

Regardless of the exact application, electrical connector designs have been adapted to mirror trends in the electronics industry. Electronic systems generally have gotten smaller, faster, and functionally more complex. Because of these changes, the number of circuits in a given area of an electronic system, along with the frequencies at which the circuits operate, have increased significantly in recent years. Current systems pass more data between printed circuit boards and require electrical connectors that are electrically capable of handling more data at higher speeds than connectors of even a few years ago.

In a high density, high speed connector, electrical conductors may be so close to each other that there may be electrical interference between adjacent signal conductors. To reduce interference, and to otherwise provide desirable electrical properties, shield members are often placed between or around adjacent signal conductors. The shields may prevent signals carried on one conductor from creating "crosstalk" on another conductor. The shield may also impact the impedance of each conductor, which may further contribute to desirable electrical properties.

Other techniques may be used to control the performance of a connector. For instance, transmitting signals differentially may also reduce crosstalk. Differential signals are carried on a pair of conducting paths, called a "differential pair." The voltage difference between the conductive paths represents the signal. In general, a differential pair is designed with preferential coupling between the conducting paths of the pair. For example, the two conducting paths of a differential pair may be arranged to run closer to each other than to adjacent signal paths in the connector. No shielding is desired between the conducting paths of the pair, but shielding may be used between differential pairs. Electrical connectors can be designed for differential signals as well as for single-ended signals.

In an interconnection system, connectors are attached to printed circuit boards. Typically a printed circuit board is formed as a multi-layer assembly manufactured from stacks of dielectric sheets, sometimes called "prepreg." Some or all of the dielectric sheets may have a conductive film on one or both surfaces. Some of the conductive films may be patterned, using lithographic or laser printing techniques, to form conductive traces that are used to make interconnections between circuit boards, circuits and/or circuit elements. Others of the conductive films may be left substantially intact and may act as ground planes or power planes that supply the reference potentials. The dielectric sheets may be formed into an integral board structure by heating and pressing the stacked dielectric sheets together.

To make electrical connections to the conductive traces or ground/power planes, holes may be drilled through the printed circuit board. These holes, or "vias," are filled or plated with metal such that a via is electrically connected to one or more of the conductive traces or planes through which it passes.

To attach connectors to the printed circuit board, contact "tails" from the connectors may be inserted into the vias or attached to conductive pads on a surface of the printed circuit board that are connected to a via.

SUMMARY

Embodiments of a high speed, high density interconnection system are described.

Some embodiments relate to a leadframe assembly. The leadframe assembly may include a plurality of conductive elements. Each of the plurality of conductive element may include a mating end, a mounting end opposite the mating end, and an intermediate portion extending between the mating end and the mounting end. The mating ends of the plurality of conductive elements may be aligned in a first row. The mounting ends of the plurality of conductive elements may be aligned in a second row parallel to the first row. The intermediate portions of the plurality of conductive elements may be bent so as to provide first segments parallel to the mating ends and second segments parallel to the mounting ends. The leadframe assembly may include a leadframe housing holding the intermediate portions of the plurality of conductive elements, and a shield separated from the plurality of conductive elements by the leadframe housing. The leadframe housing may include a first portion holding the first segments of the plurality of conductive elements and comprising a first plurality of projections, and a second portion holding the second segments of the plurality of conductive elements and comprising a second plurality of projections. The shield may include a plurality of mating ends aligned in the first row, a first plurality of openings having the first plurality of projections extending therethrough, and a second plurality of openings having the second plurality of projections extending therethrough. The first plurality of openings may be filled by the first plurality of projections. The second plurality of openings may be at least partially filled by the second plurality of projections.

In some embodiments, the first plurality of projections may have distal portions that are wider, in at least one direction, than the first plurality of openings. The second plurality of projections may have distal portions that are wider, in at least one direction, than the second plurality of openings.

In some embodiments, the first plurality of openings may be circular. The second plurality of openings may be elongated.

In some embodiments, the first plurality of projections may have a same size of the second plurality of projections. The first plurality of openings may be smaller than the second plurality of openings.

In some embodiments, the first plurality of projections may be disposed in rows parallel to the first row and columns perpendicular to the first row.

In some embodiments, the first portion of the leadframe housing may comprise a plurality of first openings that separate the first plurality of projections in the rows.

In some embodiments, the first portion of the leadframe housing may comprise a plurality of second openings disposed in rows parallel to the first row and offset from the rows of the first plurality of projections.

In some embodiments, portions of the intermediate portions of the plurality of conductive elements may be exposed through the plurality of first openings and the plurality of second openings. The exposed portions of the intermediate portions of the plurality of conductive elements may be wider than unexposed portions of the intermediate portions of the plurality of conductive elements.

In some embodiments, the shield may comprise a plurality of mounting ends aligned in a third row that is parallel to and offset from the second row.

In some embodiments, the intermediate portions of the plurality of conductive elements may comprise transition portions bending at a right angle. The transition portions of the plurality of conductive elements may be exposed in an opening between the first portion and the second portion of the leadframe housing.

In some embodiments, the shield may comprise transition portions between a first portion having the first plurality of openings and a second portion having the second plurality of openings. The transition portions of the shield may overlap with the transition portions of the intermediate portions of the plurality of conductive elements.

In some embodiments, the second portion of the leadframe housing may comprise a plurality of members. The shield may comprise a plurality of openings. The plurality of members of the second portion of the leadframe housing may pass the plurality of openings of the shield.

Some embodiments relate to an electrical connector. The electrical connector may include a housing, and a plurality of leadframe assemblies held by the housing. Each leadframe assembly may include a plurality of conductive elements. Each of the plurality of conductive elements may include a mating end, a mounting end opposite the mating ends, and an intermediate portion extending between the mating end and the mounting end. Each leadframe assembly may include a leadframe housing holding the intermediate portions of the plurality of conductive elements and comprising a plurality of projections, and a shield coupled to the leadframe housing and comprising a body and a plurality of mating ends extending from the body, the body comprising a plurality of openings having the plurality of projections extending therethrough. The plurality of openings of the body of the shield may comprise a first portion of a first size and a second portion of a second size larger than the first size. The first portion of the plurality of openings of the body of the shield may be closer to the mating ends than the second portion of the plurality of openings of the body of the shield.

In some embodiments, the plurality of projections of the leadframe housing may have distal portions that are wider, in at least one direction, than the plurality of openings of the shield.

In some embodiments, the first portion of the plurality of openings of the body of the shield may comprise a width in a row direction and a first length in a direction perpendicular to the row direction. The second portion of the plurality of openings of the body of the shield may comprise the width in the row direction and a second length in the direction perpendicular to the row direction. The second length may be longer than the first length.

In some embodiments, the leadframe housing may comprise a plurality of openings having portions of the intermediate portions of the plurality of conductive elements exposed therethrough. The exposed portions of the intermediate portions of the plurality of conductive elements exposed therethrough may be wider than unexposed portions of the intermediate portions of the plurality of conductive elements.

In some embodiments, the plurality of projections of the leadframe housing may be disposed in rows. The plurality of openings of the leadframe housing may comprise first openings that separate the plurality of projections in a row.

In some embodiments, the plurality of openings of the leadframe housing may comprise second openings disposed in rows parallel to and offset from rows of the plurality of projections.

In some embodiments, the housing may comprise a front housing. The electrical connector may comprise a plurality of core members held by the front housing. The plurality of core members may comprise conductive material. The mating ends of the plurality of leadframes may be disposed on opposite sides of respective core members of the plurality of core members. The mating ends of the shields of the leadframes on the opposite sides of a core member of the plurality of core members may be coupled via the conductive material of the core member.

In some embodiments, the conductive material of the core members may be configured to provide ground paths between the mating ends of the shields of the leadframes on the opposite sides of core members.

In some embodiments, for each leadframe assembly: the leadframe housing may comprise a first portion holding first segments of the plurality of conductive elements and a second portion holding second segments of the plurality of conductive elements; the first portion of the leadframe housing may comprise a first portion of the plurality of projections that extend through the first portion of the plurality of openings of the body of the shield; and the second portion of the leadframe housing may comprise a second portion of the plurality of projections that extend through the second portion of the plurality of openings of the body of the shield.

In some embodiments, the second portion of the leadframe housing may comprise a plurality of members. The shield may comprise a second plurality of openings receiving the plurality of members of the second portion of the leadframe housing.

In some embodiments, the first portion of the plurality of openings of the body of the shield may be filled by the first plurality of projections. The second portion of the plurality of openings of the body of the shield may be partially filled by the second plurality of projections.

Some embodiments relate to a method of manufacturing a leadframe assembly that comprises a plurality of conductive elements each comprising a mating end, a mounting end opposite the mating ends, and an intermediate portion extending between the mating end and the mounting end, and a leadframe housing holding the intermediate portions of the plurality of conductive elements. The method may include inserting a first plurality of projections extending from the leadframe housing into a first plurality of openings of a shield; moving the shield such that the first plurality of projections slide in the first plurality of openings of the shield until a second plurality of projections extending from the leadframe housing enter a second plurality of openings of the shield; and deforming the first plurality of projections and the second plurality of projections to mechanically lock the leadframe housing and the shield together.

In some embodiments, the method may include overmolding the plurality of conductive elements to form the leadframe housing; and severing tie bars connecting the plurality of conductive elements.

In some embodiments, the leadframe housing may comprise first and second portions separate by an opening exposing portions of the intermediate portions of the plurality of conductive elements. The method may comprise bending the exposed portions of intermediate portions of the plurality of conductive elements.

In some embodiments, deforming the first plurality of projections and the second plurality of projections comprises heat staking the first plurality of projections and the second plurality of projections.

These techniques may be used alone or in any suitable combination. The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 4G1-4G2 are perspective views of leadframe housings of the leadframe assembly of FIG. 4D, showing a side with heat stake posts, illustrating the posts before and after heat stake respectively, according to some embodiments.

FIGS. 4AA, 4AB, 4AC1 and 4D1 are side views of the leadframe assembly of FIG. 4D, illustrating a method of manufacturing the leadframe assembly, according to some embodiments.

FIGS. 4AC2 and 4AD2 are perspective views of the leadframe assembly in the state of manufacture shown in FIGS. 4AC1 and 4D1, respectively.

DETAILED DESCRIPTION

Figure 1:
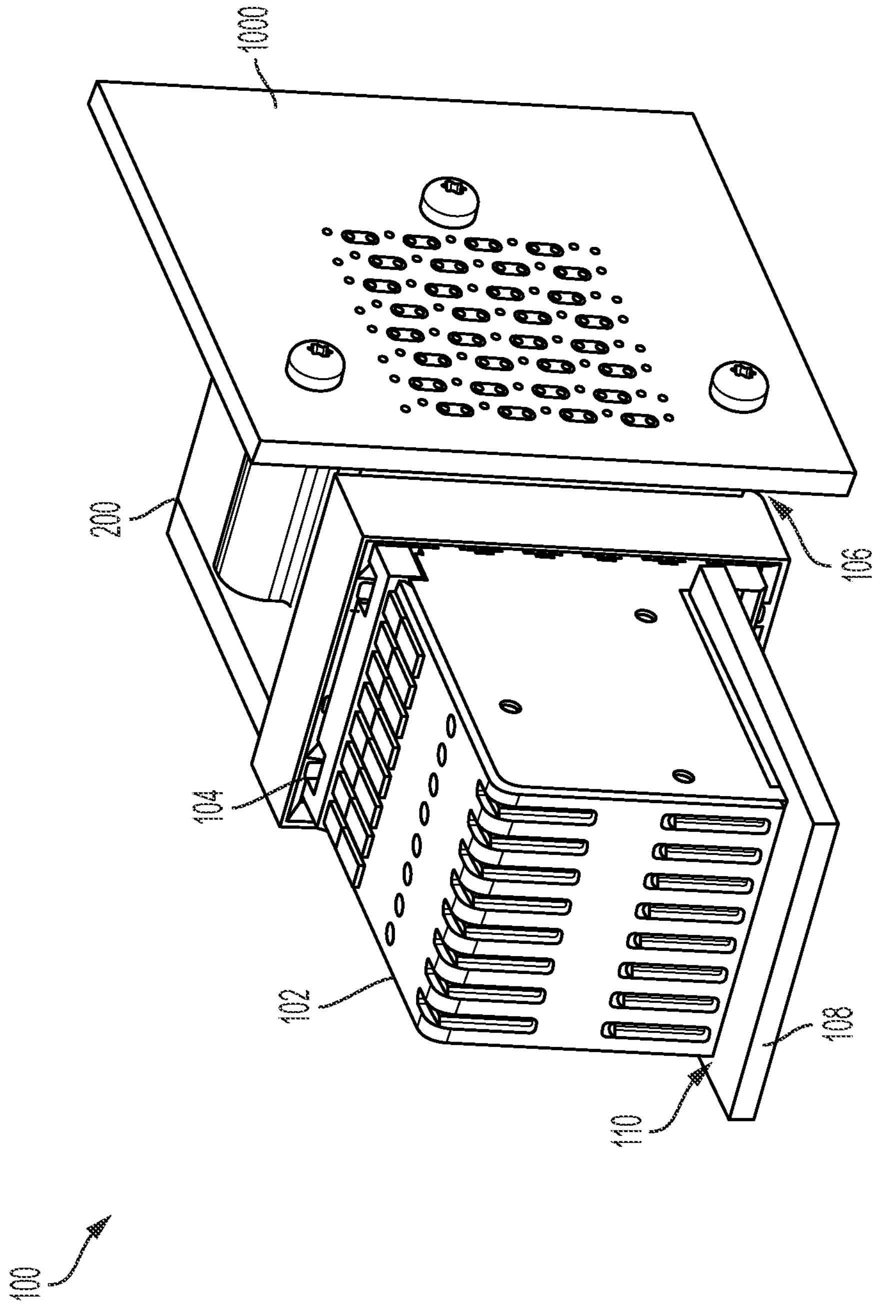
FIG. 1 is a perspective view of an electrical interconnection system, according to some embodiments.

The inventors have recognized and appreciated connector designs that increase performance of a high density interconnection system, particularly those that carry very high frequency signals that are necessary to support high data rates. The connector designs may provide conductive shielding and lossy material in locations that provide desirable performance at very high frequencies to support high data rates, including at 112 Gbps and above, for closely spaced signal conductors of a high density interconnect. These designs may also provide a robust connector that is economical to manufacture, even when miniaturized to provide high density interconnects.

Conventional designs, while effective up to certain frequencies, may not perform as expected at very high frequencies, for example, at or above 112 Gbps. To enable effective isolation of the signal conductors at very high frequencies, the connector may include conductive material selectively molded over by lossy material. The conductive material may provide effective shielding in a mating region where two connectors are mated. When the two connectors are mated, the mating interface shielding may be disposed between mated portions of conductive elements carrying separate signals.

These techniques may be applied to a connector that supports a direct mate orthogonal system configuration. The connector may have rows of conductive elements, parallel to a surface of a printed circuit board to which the connector is mounted, configured for mating with a second connector that has columns of conductive elements perpendicular to a surface of a second printed circuit board to which the second connector is mounted.

The direct mate orthogonal connector may be constructed of leadframe assemblies including shielding for the intermediate portions of conductive elements passing through the connector. Components of the leadframe assembly may be configured to preserve the positional relationship between the shield and signal conductive elements upon insertion of the mounting ends of the conductive elements and shields into holes in a printed circuit board, enhancing high frequency performance. Signal conductors, for example, may be held within an insulative housing of the leadframe assembly. The leadframe housing may have features that engage with a leadframe shield and a connector housing. The leadframe housing may transfer a force applied to the connector housing to mount a connector onto a printed circuit board to both the conductive elements in the leadframe and the leadframe shields. Relative position of the shield and conductive elements may be maintained, even under the force of inserting pressfits of the shield and conductive elements into holes in aboard for mounting the connector.

Alternatively or additionally, the positional relationship between the shield and signal conductive elements may be preserved by heat staking the shield to the housing of the leadframe assembly that is also fixing the position of the signal conductive elements within the leadframe assembly. Heat staking may hold the shield a fixed distance from the signal conductive elements yet may be achieved with a simple manufacturing process for a leadframe assembly. The simple manufacturing technique may be applied to leadframe assemblies in multiple configurations, including leadframe assemblies that bend through an angle, such as a 90 degree angle. In embodiments in which ground mating contact portions extend from the shield, heat staking may provide for repeatable, reliable mating throughout the connector lifetime. Movement of the ground mating contact portions relative to the mating contact portions of the signal conductive elements may be prevented, even after repeated mating and unmating cycles. Because relative movement of the signal and the ground conductors may impact impedance of the signal paths or otherwise altering performance of the connector, heat staking may increase the reliability and performance of a connector over its lifetime.

Desirable electrical performance at the mating interface may be provided through the use of core members that include conductive material and/or lossy material. These core members may be integrated into a front portion of a housing for the connector such that, when the leadframe assemblies are inserted into the housing, the mating ends of the conductive elements of the leadframe assemblies align with the core members.

The core members may be formed with features that facilitate mating, including projections that deflect the mating ends of conductive elements from the second connector to avoid mechanical stubbing of the mating ends of the two connectors. These features may be readily molded in the core members, even if molding similar features as part of the housing would be difficult or prone to manufacturing defects. The conductive material in the core member, in addition to enhancing electrical performance may provide a mechanical function, such as stiffening the core members and facilitating integration of the core members in the housing.

The connector may have features that support desirable electrical and/or mechanical properties at a mounting interface. To reduce undesirable emissions at a mounting region where the connector is mounted to a printed circuit board (PCB), the connector may include a compressible shield. The compressible shield may be configured to provide current paths between internal shields within the connector and ground structures in the PCB. These current paths may run parallel to signal conductors passing from the connector to the PCB. The inventors have found that such a compressible shield, though spanning a small distance between the connector and the board, such as 2 mm or less, provides a desirable increase in signal integrity, particularly for high frequency signals.

A compressible shield may be simply implemented with a conductive foam sheet, which may be adhere to an organizer of the connector. The organizer may include standoffs that set a spacing between the connector and the PCB when the connector is secured to the board, such as with screws. Such a configuration precludes the counter force generated by compression of the compliant shield from disrupting reliable mounting of the connector to the board, ensuring robust attachment of the connector to the board. The standoffs may have a height that provides partial compression of compliant shield, ensuring a reliable connection between internal shields and the ground planes of the printed circuit board notwithstanding variations in dimensions of parts as manufactured.

A printed circuit board to which the direct mate orthogonal connector is mounted also may be configured for enhanced electrical and mechanical performance. Robust connector performance may also be enhanced by aligning press fits of conductors of a leadframe assembly, including the signal conductive elements and leadframe shields, with intermediate portions of those conductors. Such a configuration may transfer force through the intermediate portion in a direction aligned with the press fit, providing a low risk of the press fits collapsing upon mounting of a connector to a PCB. Mounting holes in the PCB may be configured to support this configuration. In some embodiments, a connector footprint in the PCB may have pairs of mounting holes positioned in rows, receiving pressfits of pairs of signal conductive elements in the leadframe assemblies.

Holes for receiving pressfits for the leadframe shields may also be positioned in rows, parallel to the rows of holes for the signal conductive elements. A row of holes of the shield pressfits of a leadframe assembly may be offset in the column direction, perpendicular to the row direction, from the row of holes for the signal pressfits for that leadframe. A hole for a shield pressfit may be adjacent each pair of holes for signal pressfits.

In some embodiments, shadow vias, which may be smaller in diameter than the vias that receive pressfits may be connected to ground and positioned, within a row of signal vias, between each pair. Alternatively or additionally, shadow vias may be positioned between each pair of signal vias in a row and a pair of signal vias in an adjacent parallel row.

These techniques may be used separately or may be used together, to provide desirable electrical characteristics for the interconnection system from the board through the connector to another connector, which may similarly be configured for desirable electrical performance at high frequencies. An example of such an electrical connector is shown, for example, in co-pending application Ser. No. 17/158,214 titled "HIGH SPEED CONNECTOR," which is hereby incorporated herein by reference in its entirety.

An exemplary embodiment of such connectors is illustrated in FIG. 1 in which a direct mate orthogonal connector has a right angle orthogonal configuration. FIG. 1 depicts an electrical interconnection system 100 of the form that may be used in an electronic system. This example illustrates a direct mate orthogonal configuration, as printed circuit board 108 is orthogonal, and edge to edge, with respect to printed circuit board 1000. Electrical connections between PCB 108 and 1000 are made through two mating connectors, here illustrated as a right angle orthogonal connector 200 and a right angle connector 102.

FIG. 1 illustrates a portion of an electronic system, such as an electronic switch or router. FIG. 1 illustrates only a portion of each of the PCB's 108 and 1000. Other portions of the PCB's, including portions to which other connectors or other electronic components are mounted, are not shown for simplicity. Further, such a system may include more than two printed circuit boards. Additional printed circuit boards, parallel to either PCB 108 or PCB 1000, may be included, for example. Regardless of the number of printed circuit boards, connectors as illustrated in FIG. 1 may be used to make connections between those that are orthogonal to each other.

In the illustrated embodiment, the right angle orthogonal connector 200 is attached to a printed circuit board 1000 at a mounting interface 106, and mated to the header connector 700 at a mating interface 104. The right angle connector 102 may be attached to a printed circuit board 108 at a mounting interface 110. At the mounting interfaces, conductive elements, acting as signal conductors, within the connectors may be connected to signal traces within the respective printed circuit boards. For connectors including ground conductive elements, those may be connected to ground structures within the printed circuit board.

To support mounting of the connectors to respective printed circuit boards, right angle orthogonal connector 200 may include contact tails configured to attach to the printed circuit board 1000. The right angle connector 102 may include contact tails configured to attach to the printed circuit board 108. These contact tails may form one end of conductive elements that pass through the mated connectors. When the connectors are mounted to printed circuit boards, these contact tails will make electrical connection to conductive structures within the printed circuit board that carry signals or are connected to a reference potential. In some embodiments, the contact tails may be press fit, "eye of the needle (EON)," contacts that are designed to be pressed into vias in a printed circuit board, which in turn may be connected to signal traces or ground planes or other conductive structures within the printed circuit board. In some embodiments, other forms of contact tails may be used, for example, surface mount contacts, BGA attachments, or pressure contacts.

At the mounting interfaces, shields internal to the connectors may also be connected to conductive structures in the printed circuit boards. Such connections may be made using the same techniques as for the signal and/or ground conductive elements. Alternatively or additionally, shields may be connected through the use of compliant members and/or compliant shields that provide a conductive path for conductive structures in the connector to ground planes on the surface of the PCB.

At the mating interfaces, the conductive elements in each connector make mechanical and electrical connections such that the conductive traces in the printed circuit board 108 may be electrically connected to conductive traces in the printed circuit board 1000 through the mated connectors. Conductive elements acting as ground conductors within each connector may be similarly connected, such that the ground structures within the printed circuit board 108 similarly may be electrically connected to ground structures in the printed circuit board 1000.

In the embodiment of FIG. 1, each of the connectors has linear arrays of mating ends for the conductive elements that mate to other conductive elements at the mating interface. In mating the two connectors, each linear array of mating ends of one connector aligns with, and presses against, the mating ends in a linear array of the other connector. In the illustrated embodiment, the mating ends have broadsides and edges. Each of the linear arrays may include mating ends positioned edge-to-edge along the array, such that the broadsides are parallel to the axis of the array. When mated, the broadsides of two mating ends may press against each other.

In the orthogonal configuration of FIG. 1, to achieve alignment of broadsides of the mating ends of connectors mounted to orthogonal PCBs, the two mating connectors have arrays with different orientations relative to the PCB to which the connector is mounted. In this example, connector 102 has columns of mating ends extending perpendicularly to PCB 108 in a vertical orientation. Connector 200 has rows of mating ends extending parallel to PCB 1000 in a horizontal orientation.

In the example of FIG. 1, connector 102 may be a right angle connector, such as used in mating to a backplane header or a cable connector. Such a connector, and construction techniques to make such a connector, are described in co-pending application Ser. No. 17/158,214 titled "HIGH SPEED CONNECTOR." Orthogonal connector 200 may be constructed using the same construction techniques, adapted for a direct mate orthogonal form factor. The construction techniques described more fully in co-pending application Ser. No. 17/158,214 titled "HIGH SPEED CONNECTOR" and applied to connector 200 may include the use of insert molded leadframe assemblies (IMLAs), with IMLA shields. Those techniques also include the use of a core member, containing features of a mating interface of the connector that is molded separately from, but added into a connector housing into which the IMLAs are inserted. Shielding within the core members, incorporation of lossy material at the mating interface and interconnection of the core shield and IMLA shield may also be applied to connector 200. Further, an organizer and/or a compliant shield at the mounting interface may also be employed. Further details of these techniques as adapted for use in connector 200 are provided below.

Figure 2B:
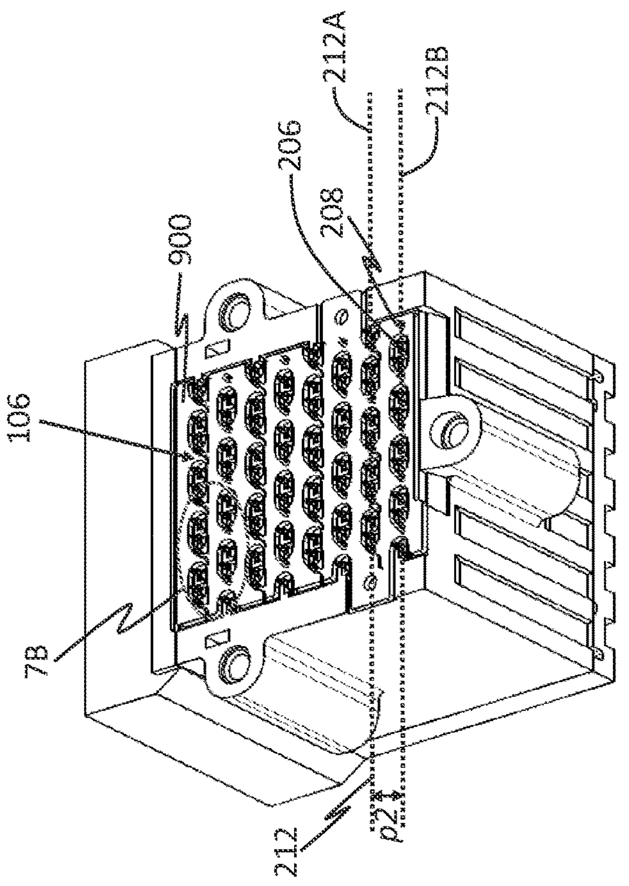
FIG. 2B is a perspective view of the right angle orthogonal connector of FIG. 2A, illustrating the mounting interface of the right angle orthogonal connector, according to some embodiments.
Figure 2A:
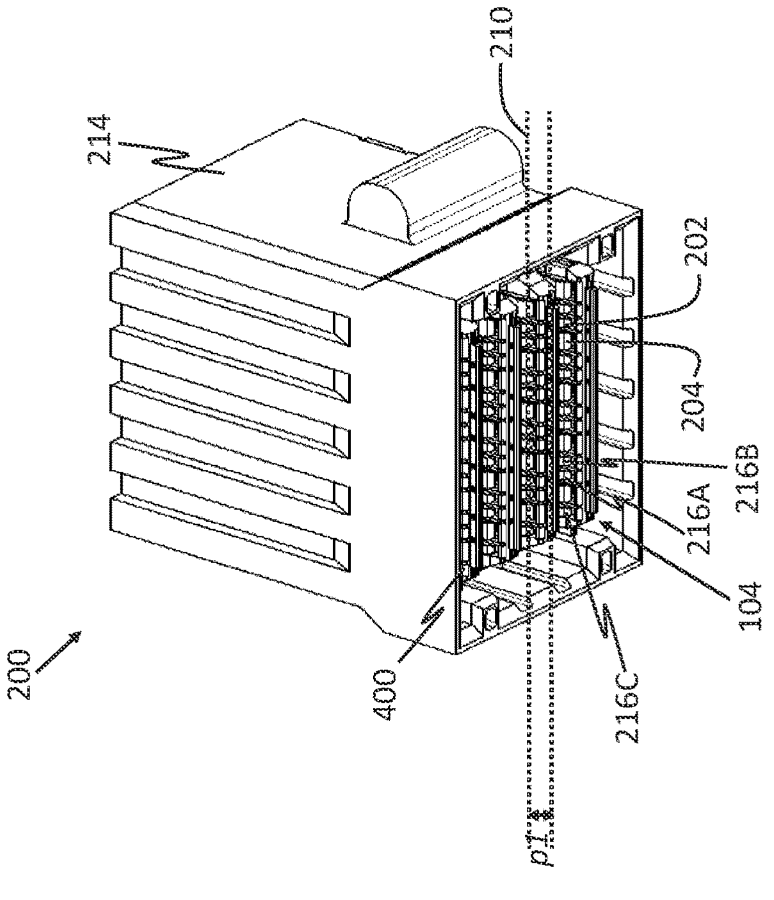
FIG. 2A is a perspective view of a right angle orthogonal connector in the electrical interconnection system of FIG. 1, illustrating the mating interface of the right angle orthogonal connector, according to some embodiments.
Figure 2C:
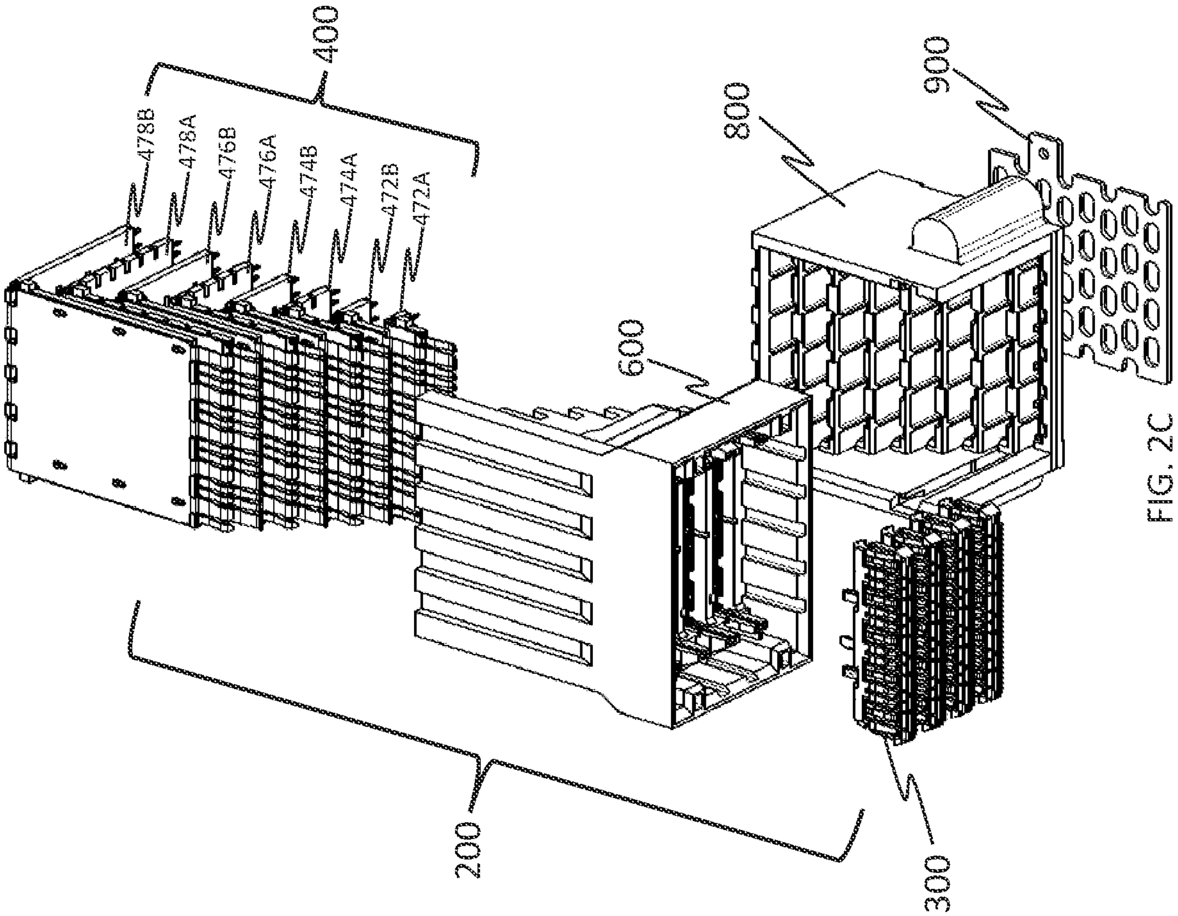
FIG. 2C is an exploded view of the right angle orthogonal connector of FIG. 2A, according to some embodiments.

FIGS. 2A and 2B are perspective views of the right angle orthogonal connector 200, according to some embodiments. FIG. 2C is an exploded view of the right angle orthogonal connector 200, according to some embodiments. The right angle orthogonal connector 200 may include leadframe assemblies 400, core members 300, a housing 214 holding the leadframe assemblies 400, and a compressible shield 900 at the mounting interface 106. The leadframe assemblies 400 may include mating ends (e.g., signal mating ends 202 and ground mating ends 204) disposed in rows 210 at the mating interface 104, and mounting ends (e.g., signal mounting ends 206 and ground mounting ends 208) disposed in rows 212 at the mounting interface 106.

The rows 210 may have a row-to-row pitch p1. The row-to-row pitch p1 may be compatible with a mating connector (e.g., the right angle connector 102). The rows 212 may be parallel to the rows 210, and have a row-to-row pitch p2. The row-to-row pitch p2 may be configured for a suitable footprint on a board (e.g., the printed circuit board 1000). In some embodiments, the row-to-row pitch p2 may have the same value as the row-to-row pitch p1. In some embodiments, the row-to-row pitch p2 may have a value different from that of the row-to-row pitch p1. The inventors found that such design enables the connectors to be matable with existing connectors, which may have larger pitches, and to have a desirable footprint, which may have a density higher than that of the existing connectors such that the row pitch p2 may be smaller than that of existing connectors and may also be smaller than row pitch p1.

At the mating interface 104, a row 210 of mating ends may include signal mating ends shaped and spaced in pairs to provide pairs of differential signal mating ends (e.g., 216A and 216B), and/or signal mating ends shaped and spaced to form single ended signal mating ends (e.g., 216C). The signal mating ends may be separated by respective ground mating ends 204. It should be appreciated that ground conductors need not be connected to earth ground, but are shaped to carry reference potentials, which may include earth ground, DC voltages or other suitable reference potentials. The "ground" or "reference" conductors may have a shape different than the signal conductors, which are configured to provide suitable signal transmission properties for high frequency signals.

Correspondingly, at the mounting interface 106, a row 212 of mounting ends may include signal mounting ends 206 and ground mounting ends 208. As illustrated in FIG. 2B, the mounting ends of the adjacent rows 212A and 212B may be offset from each other such that the ground mounting ends in the row 212A may overlap with signal mounting ends in the row 212B and reduce row-to-row cross talk.

The housing 214 may include one or more separately formed portions that engage to one another or are otherwise held together in a connector. In the illustrated example, housing 214 includes a front housing 600 and a rear housing 800. Front housing 600 may include a mating interface of connector 200. Core members 300 may be held by the front housing 600, and may form a portion of the mating interface of the connector.

Rear housing 800 may engage with, and may partially enclose, the front housing 600. Rear housing 800 may include the mounting interface of connector 200. In the illustrated example, rear housing 800 includes a bottom surface through which mounting ends of the conductors within connector 200 extend. That floor may be insulative and may act as an organizer for the mounting ends that positions and/or supports the mounting ends so that they may be pressed into holes in a PCB to which connector 200 is mounted. Alternatively or additionally, the floor of rear housing 800 may serve as a support member for attaching a compressible shield 900.

As illustrated in FIG. 2C, in some embodiments, the core members 300 may be inserted into the front housing 600 in a mating direction. The leadframe assemblies 400 may be inserted into the front housing 600 from the back of the front housing 600. The rear housing 800 may be added from the bottom of the front housing 600 such that the mounting ends of the leadframe assemblies 400 extend out of the rear housing 800.

Figure 3B:
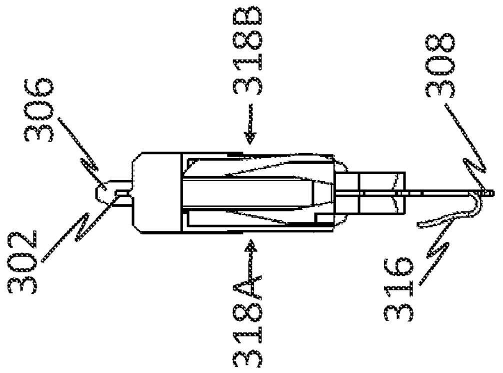
FIG. 3B is a side view of the core member of FIG. 3A, according to some embodiments.
Figure 3C:
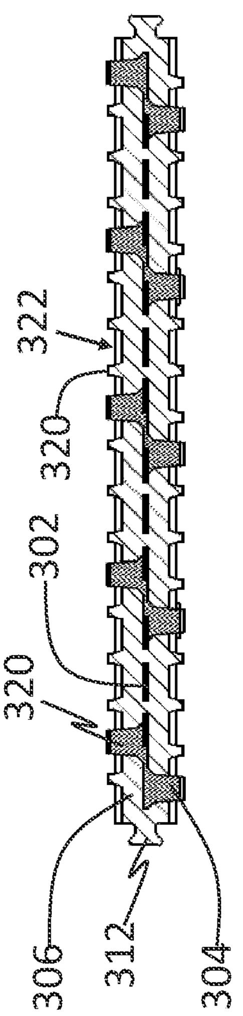
FIG. 3C is a cross-sectional view of the core member of FIG. 3A along the line marked "X-X" in FIG. 3A, according to some embodiments.
Figure 3A:
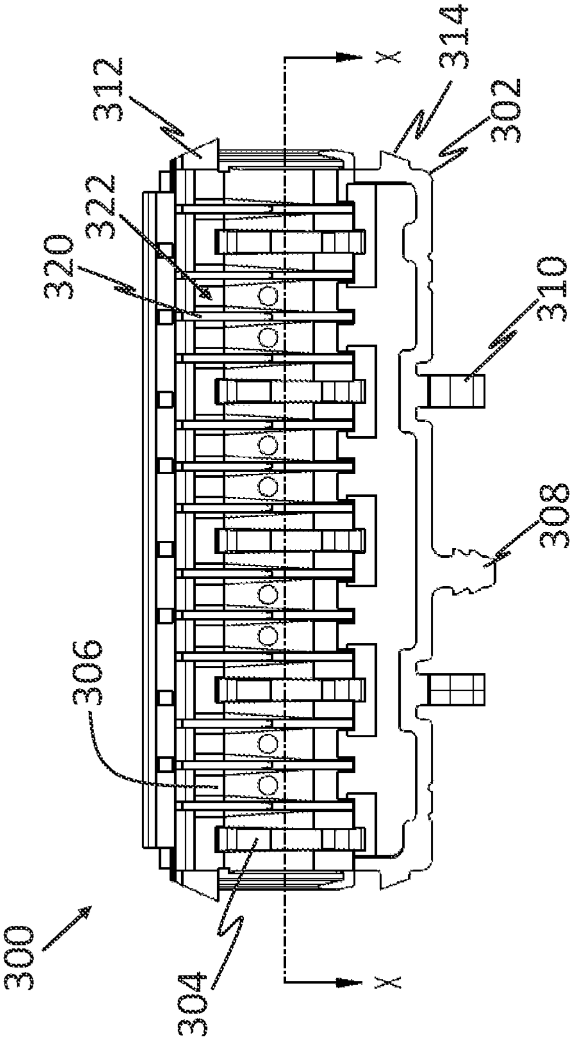
FIG. 3A is an elevation view of a core member of the right angle orthogonal connector of FIG. 2A, according to some embodiments.
Figure 3D:
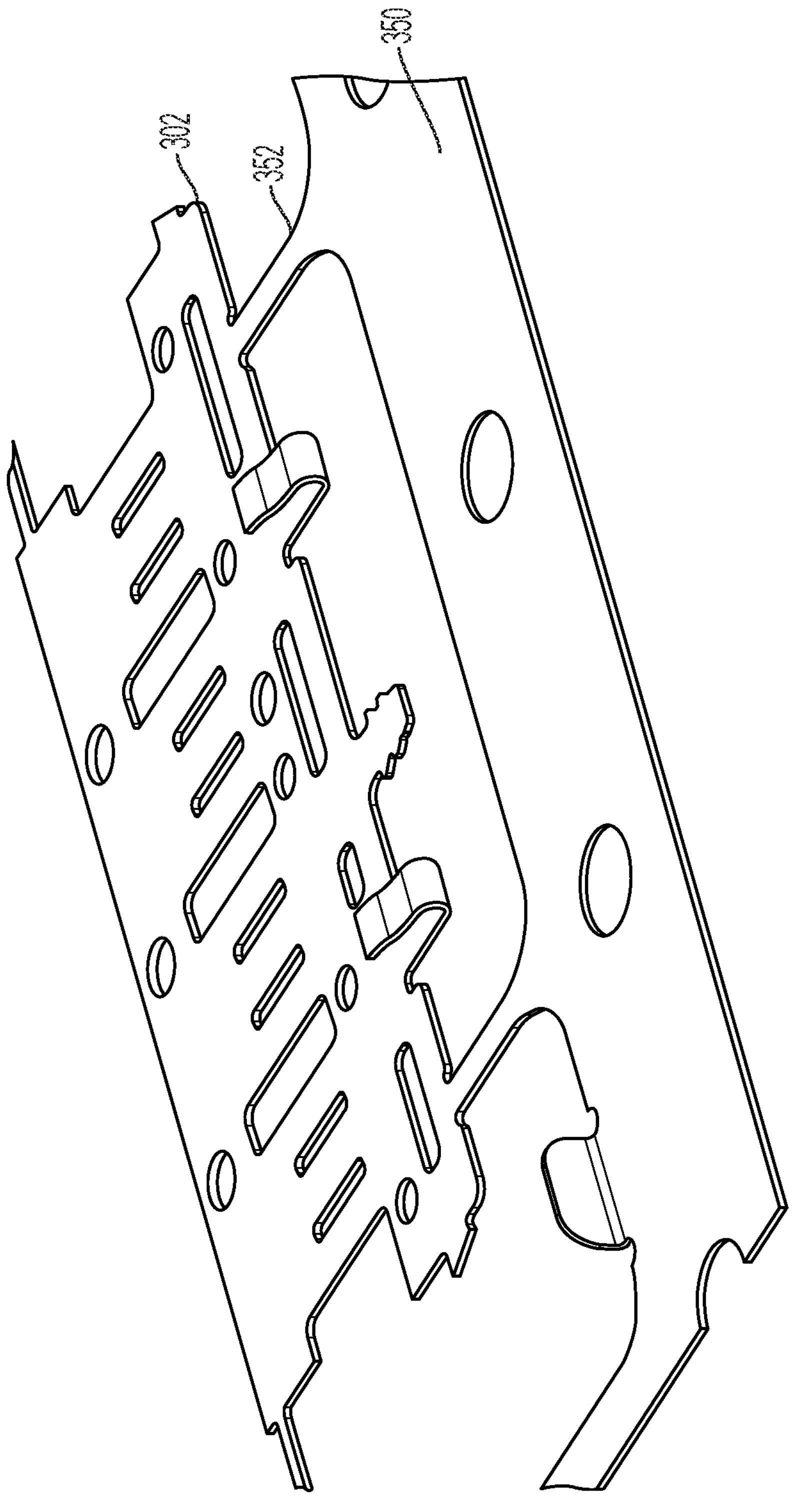
FIG. 3D is a perspective view of conductive material of a core member attached to carrier strips, prior to being molded over with lossy and insulative material.

A core member 300 may be adjacent the mating ends of one or more leadframe assemblies 400. In the illustrated embodiments, the mating ends of two leadframe assemblies are on opposite sides of each core member. FIG. 3A and FIG. 3B depict a top plan view and a side view of a core member 300, respectively, according to some embodiments. FIG. 3C depicts a cross-sectional view of the core member 300 along the line marked "X-X" in FIG. 3A, according to some embodiments. FIG. 3D depicts conductive material 302 within a core member, with lossy material and insulative material, which may be molded over the conductive material 302, not shown. FIG. 3D illustrates the conductive material 302 attached to a carrier strip 350 through tie bars 352, which may be formed at the same time that conductive material 302 is cut from a larger sheet of metal. Carrier strip 350 may be used to manipulate conductive material 302 during insert molding operations. A core member 300 may be freed from the carrier strip 350 after severing the tie bars 352 and prior to insertion of a core member 300 into a front housing 600.

The core member 300 may include conductive material 302 selectively overmolded with lossy material 304 and insulative material 306. The conductive material 302 may be metal or any other material that is conductive and provides suitable mechanical properties for shields in an electrical connector. Stainless steel, or phosphor-bronze, beryllium copper and other copper alloys are non-limiting examples of materials that may be used. The conductive material may be a sheet of metal that is stamped and formed into the shape illustrated. In some embodiments, the conductive material may have a planar region that passes through the interior of the core member. That planar region, for example, may be along the midline of the core member such that it is equidistant from the mating ends on opposing sides of the core member. That planar region may be solid, may contain one or more holes and/or slits to enable lossy or insulative material to flow through the conductive material during an insert molding operation and lock onto the conductive material, for example. Features may be formed in the conductive material to support other functions. For example, features may be formed at the periphery of the conductive material to mechanically and/or electrically connect the core member to other structures in the connector, such as the front housing, the housing of leadframe assemblies and/or shields of the leadframe assemblies.

The conductive material 302 may include retention features 308 configured to be inserted into matching receivers in the front housing 600. Here the retention features are configured as barbed tabs that can be inserted into a slot in a cross piece, such as slot 652 in cross piece 650 (FIG. 6) of front housing 600. Barbs 314 may also be formed to engage side walls of the front housing.

The conductive material 302 may include projections for making contact with other ground structures within the connector 200. Here those projections are configured as hooks 310 with distal ends serving as contact portions 316. Contact portions 316 may be positioned to press against a leadframe shield when the core member and leadframes are both inserted in front housing 600. In this example, hooks 310 fit within openings 604 (FIG. 6) of cross piece 650 such that contact portions 316 will press against a leadframe shield of a respective one of the leadframe assemblies 472A, 474A, 476A and 478A with mating ends aligned with the lower side of the core member.

In the illustrated example, the conductive material 302 of a core member 300 includes a retention feature 308 in the middle and two hooks 310 on opposite side of the retention feature. The contact portions 316 of the two hooks 310 are, in this example, in the same direction so as to make contact with the same leadframe shield but may, in other embodiments, be bent in opposite directions such that one contact portion 316 can make contact with ground structures of a first leadframe assembly 400 at a first side 318A of the core member 300, and the other contact portion 316 can make contact with ground structures of a second leadframe assembly 400 at a second side 318B of the core member 300.

Figure 3E:
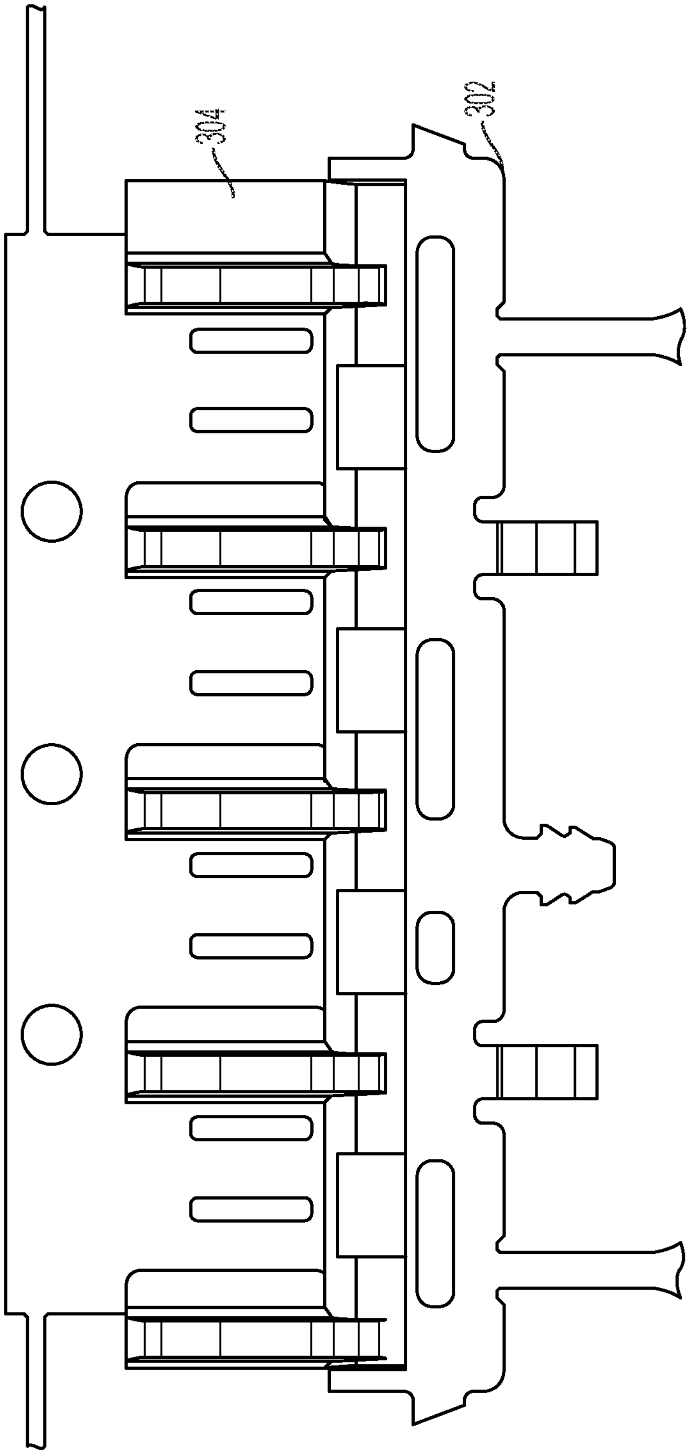
FIG. 3E shows the conductive material of FIG. 3D after being molded over with lossy material.

Lossy material 304 may be selectively molded over the conductive material. The lossy material 304 may form ribs 320, which may be configured to make contact with ground mating ends, which here extend from IMLA shields (e.g., ground mating ends 208). FIG. 3E shows conductive material 302, as in FIG. 3D, overmolded with lossy material 304.

Any suitable lossy material may be used for the lossy material 304 and other structures that are "lossy." Materials that conduct, but with some loss, or material which by another physical mechanism absorbs electromagnetic energy over the frequency range of interest are referred to herein generally as "lossy" materials. Electrically lossy materials can be formed from lossy dielectric and/or poorly conductive and/or lossy magnetic materials. Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Practical lossy magnetic materials or mixtures containing lossy magnetic materials may also exhibit useful amounts of dielectric loss or conductive loss effects over portions of the frequency range of interest. Electrically lossy material can be formed from material traditionally regarded as dielectric materials, such as those that have an electric loss tangent greater than approximately 0.05 in the frequency range of interest. The "electric loss tangent" is the ratio of the imaginary part to the real part of the complex electrical permittivity of the material. Electrically lossy materials can also be formed from materials that are generally thought of as conductors, but are either relatively poor conductors over the frequency range of interest, contain conductive particles or regions that are sufficiently dispersed that they do not provide high conductivity or otherwise are prepared with properties that lead to a relatively weak bulk conductivity compared to a good conductor such as copper over the frequency range of interest.

Electrically lossy materials typically have a bulk conductivity of about 1 Siemen/meter to about 10,000 Siemens/meter and preferably about 1 Siemen/meter to about 5,000 Siemens/meter. In some embodiments, material with a bulk conductivity of between about 10 Siemens/meter and about 200 Siemens/meter may be used. As a specific example, material with a conductivity of about 50 Siemens/meter may be used. However, it should be appreciated that the conductivity of the material may be selected empirically or through electrical simulation using known simulation tools to determine a suitable conductivity that provides a suitably low crosstalk with a suitably low signal path attenuation or insertion loss.

Electrically lossy materials may be partially conductive materials, such as those that have a surface resistivity between 1 Ω/square and 100,000 Ω/square. In some embodiments, the electrically lossy material has a surface resistivity between 10 Ω/square and 1000 Ω/square. As a specific example, the material may have a surface resistivity of between about 20 Ω/square and 80 Ω/square.

In some embodiments, electrically lossy material is formed by adding to a binder a filler that contains conductive particles. In such an embodiment, a lossy member may be formed by molding or otherwise shaping the binder with filler into a desired form. Examples of conductive particles that may be used as a filler to form an electrically lossy material include carbon or graphite formed as fibers, flakes, nanoparticles, or other types of particles. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake. The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, alternative forms of binder materials may be used. Curable materials, such as epoxies, may serve as a binder. Alternatively, materials such as thermosetting resins or adhesives may be used.

Also, while the above described binder materials may be used to create an electrically lossy material by forming a binder around conducting particle fillers, the invention is not so limited. For example, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Preferably, the fillers will be present in a sufficient volume percentage to allow conducting paths to be created from particle to particle. For example, when metal fiber is used, the fiber may be present in about 3% to 40% by volume. The amount of filler may impact the conducting properties of the material.

Filled materials may be purchased commercially, such as materials sold under the trade name Celestran® by Celanese Corporation which can be filled with carbon fibers or stainless steel filaments. A lossy material, such as lossy conductive carbon filled adhesive preform, such as those sold by Techfilm of Billerica, Massachusetts, US may also be used. This preform can include an epoxy binder filled with carbon fibers and/or other carbon particles. The binder surrounds carbon particles, which act as a reinforcement for the preform. Such a preform may be inserted in a connector wafer to form all or part of the housing. In some embodiments, the preform may adhere through the adhesive in the preform, which may be cured in a heat treating process. In some embodiments, the adhesive may take the form of a separate conductive or non-conductive adhesive layer. In some embodiments, the adhesive in the preform alternatively or additionally may be used to secure one or more conductive elements, such as foil strips, to the lossy material.

Various forms of reinforcing fiber, in woven or non-woven form, coated or non-coated may be used. Non-woven carbon fiber is one suitable material. Other suitable materials, such as custom blends as sold by RTP Company, can be employed, as the present invention is not limited in this respect.

In some embodiments, a lossy portion may be manufactured by stamping a preform or sheet of lossy material. For example, a lossy portion may be formed by stamping a preform as described above with an appropriate pattern of openings. However, other materials may be used instead of or in addition to such a preform. A sheet of ferromagnetic material, for example, may be used.

However, lossy portions also may be formed in other ways. In some embodiments, a lossy portion may be formed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together. As a further alternative, lossy portions may be formed by plating plastic or other insulative material with a lossy coating, such as a diffuse metal coating.

The insulative material 306 may be molded in a second shot after the overmolding of the lossy material 304 such that some regions of the lossy material are covered by the insulative material and the insulative material 306 provides isolation at selected regions. Insulative material may be molded, for example, in regions adjacent mating ends of signal conductive elements adjacent each core member. Those regions of insulative material, for example, may include ribs 320 that separate mating ends of the signal conductive elements from adjacent signal mating ends and ground mating ends. The ribs 320, for example, may provide isolation between adjacent signal mating ends held in the spaces 322 between ribs 320. Other regions may separate the signal mating ends from the conductive material and/or lossy material.

The insulative material 306 may also include features that provide mechanical functions. For example, the insulative material 306 may include dovetails 312, which may be configured to be inserted into matching features, such as grooves 670 (FIG. 6) in the front housing 600 for alignment and retention.

The insulative material 306 may be a dielectric material such as plastic or nylon. Examples of suitable materials include, but are not limited to, liquid crystal polymer (LCP), polyphenylene sulfide (PPS), high temperature nylon or polyphenylenoxide (PPO) or polypropylene (PP). Other suitable materials may be employed, as aspects of the present disclosure are not limited in this regard.

Mating ends of two leadframe assemblies, such as leadframe assemblies 400 and 450, may be positioned on opposite sides (e.g., sides 318A and 318B) of core member 300. As shown in FIG. 2C, the leadframe assemblies may be formed in pairs, each of which includes a leadframe with mating ends aligning with a lower surface of a core member and a leadframe with mating ends that align with an upper surface of the core member. For example, the core member 300 may have a first leadframe assembly 472A on the side 318A and a second leadframe assembly 472B on the side 318B. In this example, there are eight rows of mating ends in the mating interface, corresponding to four pairs of leadframes: leadframes 472A and 472B, 474A and 474B, 476A and 476B, and 478A and 478B. In this example, the leadframes have a right angle bend and are nested, such that each successive leadframe is longer than the preceding one.

Each pair of leadframes includes an inner leadframe, 472A, 474A, 476A, or 478A, with mating ends with downward facing contact surfaces adjacent to a lower surface of the corresponding core member 300. Each pair of leadframes includes an outer leadframe, 472B, 474B, 476B, or 478B, with mating ends with upward facing contact surfaces adjacent to an upper surface of the corresponding core member 300. Similar construction techniques may otherwise be applied to manufacture the leadframes.

Figure 4B:
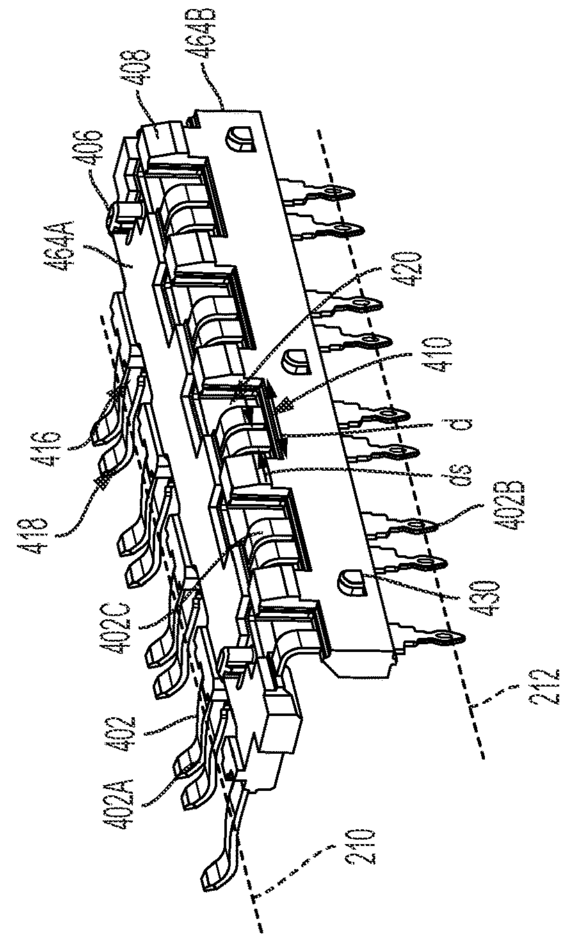
FIG. 4B is a perspective view of the leadframe assembly of FIG. 4A, with a ground shield removed, according to some embodiments.
Figure 4A:
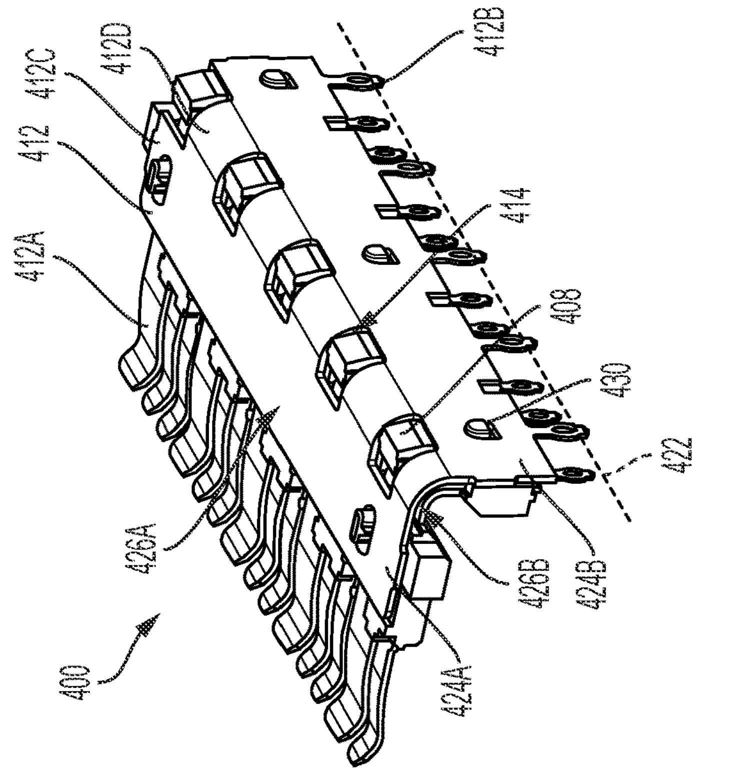
FIG. 4A is a perspective view of a leadframe assembly of the right angle orthogonal connector of FIG. 2A, according to some embodiments.
Figure 4C:
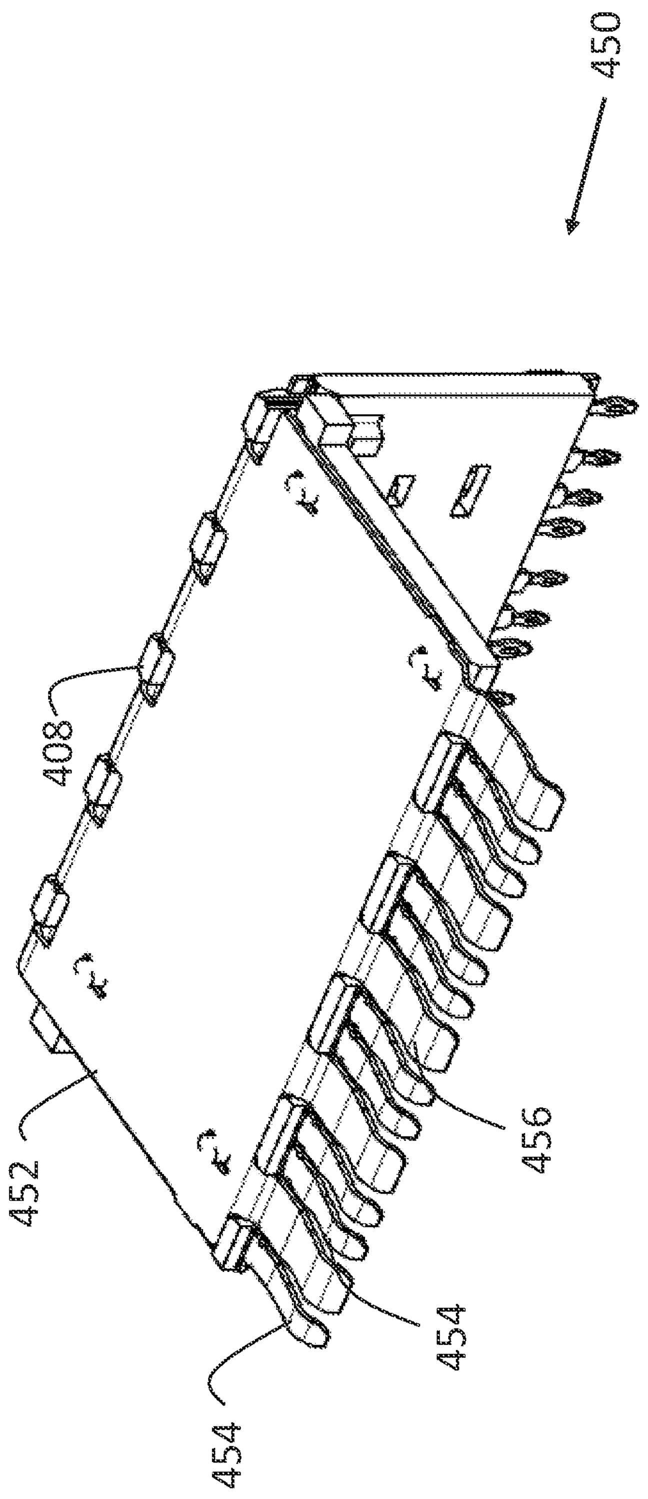
FIG. 4C is a perspective view of a leadframe assembly configured for attaching to an upper surface of a core member, according to some embodiments.

FIG. 4A depicts a perspective view of a representative leadframe assembly 400, according to some embodiments. FIG. 4B depicts a perspective view of the leadframe assembly 400, with a ground shield 412 removed, according to some embodiments. FIG. 4C is a perspective view of a leadframe assembly 450, according to some embodiments. The leadframe assembly of FIG. 4A has downward facing contact surfaces. The leadframe assembly 450 of FIG. 4C has upward facing contact surfaces. Each of the leadframe assemblies 472A, 474A, 476A and 478A may be configured as in FIGS. 4A and 4B, with the same mating and mounting interface portions. The leadframe assemblies 472A, 474A, 476A and 478A may differ in the length of the horizontal and vertical segments of the intermediate portions, with each having successively longer horizontal and vertical portions such that the leadframe assemblies may nest as shown in FIG. 2C. Similarly, each of the leadframe assemblies 472B, 474B, 476B and 478B may be configured as in FIG. 4C, with the same mating and mounting interface portions. The leadframe assemblies 472B, 474B, 476B and 478B may differ in the length of the horizontal and vertical segments of the intermediate portions, with each having successively longer horizontal and vertical portions such that the leadframe assemblies may nest. To support nesting as shown in FIG. 2C, each of the upper leadframe assemblies 472B, 474B, 476B and 478B may have longer horizontal and vertical segments of its intermediate portion than the corresponding inner leadframe assembly 472A, 474A, 476A or 478A aligned with the same core member 300.

The leadframe assembly 400 may include conductive elements 402, a leadframe housing 464 holding the conductive elements 402, and a ground shield 412 separate from intermediate portions of the conductive elements 402 by the leadframe housing 464. The conductive elements 402 may be made of metal or any other material that is conductive and provides suitable mechanical properties for conductive elements in an electrical connector. Phosphor-bronze, beryllium copper and other copper alloys are non-limiting examples of materials that may be used. The conductive elements may be formed from such materials in any suitable way, including by stamping and/or forming.

The conductive elements 402 may be configured to transmit signals. Each conductive element 402 may include a mating end 402A, a mounting end 402B opposite the mating end, and an intermediate portion extending between the mating end 402A and the mounting end 402B. The mating ends 402A of the conductive elements 402 may be aligned in the row 210. The mounting ends 402B of the conductive elements 402 may be aligned in the row 212 that is parallel to the row 210. The rows containing the mating ends of all of the leadframe assemblies may be in a plane of a mating interface. Likewise, the rows containing the mounting ends of all of the leadframe assemblies may be in a plane of a mounting interface. The plane of the mating interface may be perpendicular to the plane of the mounting interface.

The intermediate portion of each conductive element 402 may include a transition portion 402C bent at substantially a right angle such that the mating end 402A and the mounting end 402B extend in directions substantially perpendicular to each other. Each conductive element 402 may have broadsides 416 and edges 418. The broadsides of the mating ends 402A and the broadsides of the mounting ends 402B may extend in planes substantially perpendicular to each other.

The conductive elements 402 may be held in a leadframe housing 464. In this example, the leadframe housing is overmolded on the intermediate portions so as to be secured to the intermediate portions.

Here, the leadframe housing has two portions, 464A and 464B. A first portion 464A holds the intermediate portions of signal conductors in a first, horizontal segment, aligned in the vertical direction with the mating ends of the conductive elements. A second portion 464B holds the intermediate portions in a second, vertical segment of the intermediate portions aligned in the horizontal direction with the mounting ends of the conductive elements. In some embodiments, the conductive elements of the leadframe assembly may be stamped from a sheet of metal, such that the conductive elements initial generally extend in a plane. Both portions of the housing may be molded over the intermediate portions while in this state. The intermediate portions subsequently may be bent to create the right angle configuration illustrated in FIGS. 4A and 4B.

Housing 464B may include openings 410 sized and positioned such that the transition portions 402C of conductive elements 402 are exposed. Transition portions 402C of one or more conductive elements 402 may be exposed by a single opening 410. The openings 410 may have a width d that is larger than the combination of the widths ds of transition portions exposed by individual openings 410, leaving gaps 420.

The leadframe ground shield 412 may be stamped from a sheet of metal and may have a right angle bend. The ground shield 412 may be attached to housing portions 464A and 464B. Ground shield 412, for example, may be aligned and attached to the leadframe housing 464B by features 406. Ground shield 412 may be attached to housing portion 464B by hubs 430 and members 408.

The ground shield 412 may include a body 412C, ground mating ends 412A extending from the body 412C, and ground mounting ends 412B also extending from the body 412C. The body 412C may include a transition portion 412D bent at a right angle, a first portion 424A extending from the transition portion 412D, and a second portion 424B also extending from the transition portion 412D. The first and second portions 424A and 424B of the body 412C may extend in planes substantially perpendicular to each other.

The ground mating ends 412A may extend from the first portion 424A of the body 412C. As shown, for example, in FIG. 4C, the ground mating ends 412A may jog away from the plane that the first portion 424A of the body 412C extends such that the ground mating ends 412A may be aligned with the mating ends 402A of the conductive elements 402 in the row 210, which may reduce cross talk between adjacent conductive elements 402. A ground mating end may separate each of the pairs of signal conductors within a row, for example.

The inventors have recognized and appreciated that in conventional connectors jog the ground mounting ends to be in-column with signal mounting ends. The jogging lengthens a ground return path between internal shields of the connector and ground structures in the PCB, hence increasing an inductance associated with the ground return path. The higher inductance in the ground return path can cause or exacerbate resonances on the ground structures.

The ground mounting ends 412B may extend from the second portion 424B of the body 412C, without jogging to be in-row with the mounting ends 402B of the conductive elements 402. The ground mounting ends 412B may be disposed in a row 422 that is parallel to and offset from the row 212 that the mounting ends 402B of the conductive elements 402 are aligned in. The inventors found that this configuration enhances signal integrity relative to a jogged configuration, which is believed to result from a reduction in the length of the ground return path between the ground shield 412 and the ground structures in the PCB.

The ground shield 412 may include openings 414, which may be sized and positioned such that the members 408 of the leadframe housing 464 may extend out of the openings 414. In the illustrated embodiment, members 408 are positioned between pairs of signal conductors in a row. As a result, the openings 414 in shield 412 are between pairs. Thus, while creating openings in a shield is generally undesirable, positioning members 408 in this way does not lead to a significant degradation in signal integrity as a result of openings 414.

Leadframe assembly 450 of FIG. 4C may be formed using similar techniques as described above for leadframe assembly 400, except that the contact surfaces 454 of the mating ends of the signal conductive elements and mating ends 456 of the leadframe shield face upwards.

One or more features may be used to interconnect the ground structures of the interconnection system. A contact portion 316 of a hook 310, which in turn is connected to the conductive material 302 that acts as shield within the core member, may make contact with a ground shield 412 of the first leadframe assembly 400, such as at the surface 426A of the ground shield 412.

Ground paths between the leadframes on the opposite sides of individual core members may be formed through the conductive material 302 and/or lossy material 304 of the core members 300. Lossy ribs 304, for example, may couple to the mating ends of the leadframe shields. Such a design enables the connector 200 to operate at high frequencies even with the openings 410 in the leadframe housings 464.

The inventors have recognized and appreciated that bent regions in a connector (e.g., the transition portions 402C of the conductive elements 402, the transition portion 412D of the ground shield 412) may be deformed by, for example, forces generated when the connector is pressed onto a board. The inventors have recognized and appreciated connector structures that make the generated forces bypass the bent regions.

In some embodiments, features may be included in the leadframe housing to hold the spacing of the leadframe shield relative to the signal conductive elements, even in the face of pressure on the signal conductive elements and/or shields upon inserting their respective tails in holes in a printed circuit board. The leadframe housing 464B may include members 408. In the illustrated embodiment, members 408 have upper surfaces extending above an upper horizontal surface such that, when leadframe assembly 400 is inserted in a connector housing, the upper surface of member 408 may abut the connector housing such that a downward force on the connector housing may be translated into a downward force on member 408. As member 408 is coupled to the leadframe housing 464B, holding the conductive elements, that force is translated to the conductive elements.

Housing 464B may also include features that transfer a portion of the downward force on member 408 to the leadframe assembly shield. In this example, member 408 has a downward facing ledge, forming a shoulder 510 (FIG. 5B) that engages an upper surface of the leadframe assembly shield. Housing 464B also includes hubs 430 that pass through openings in the leadframe assembly shield. Hubs 430 also have downward facing ledges that similarly engage the leadframe assembly shield at an edge of the opening. Such a configuration transfers force during mounting the connector to a PCB to both the shield and the conductive elements, such that forces that might otherwise occur during mounting connector do not separate the conductive elements and the leadframe assembly shield.

The inventors have recognized and appreciated that high speed performance may be achieved by having the contact points of the ground mating ends extending from the ground shield to be in-line with the contact points of the signal mating ends of the conductive elements. Having the contact points in-line enables more efficient shielding of crosstalk among the signals transmitted through the signal mating ends by the ground, compared with when the contact points of the ground mating ends are out of line with the contact points of the signal mating ends. Forces generated when a connector is mated with another connector or pressed onto a board, however, may change the relative positions of the contact points and move the contact points out of line, which may deteriorate a connector's high frequency performance. The inventors have recognized and appreciated connector structures that preserve the positional relationship between the contact points of the ground mating ends and the contact points of the signal mating ends. The leadframe assemblies may each have signal mating ends extending from the signal conductive elements and ground mating ends extending from the ground shield. High frequency performance may be achieved with features on the leadframe housing and ground shield that ensure the positional relationship between the contacts points of the ground mating ends and the contact points of the signal mating ends to sustain forces generated during operating the connector to mate with another connector and/or mount to a board.

Figure 4D:
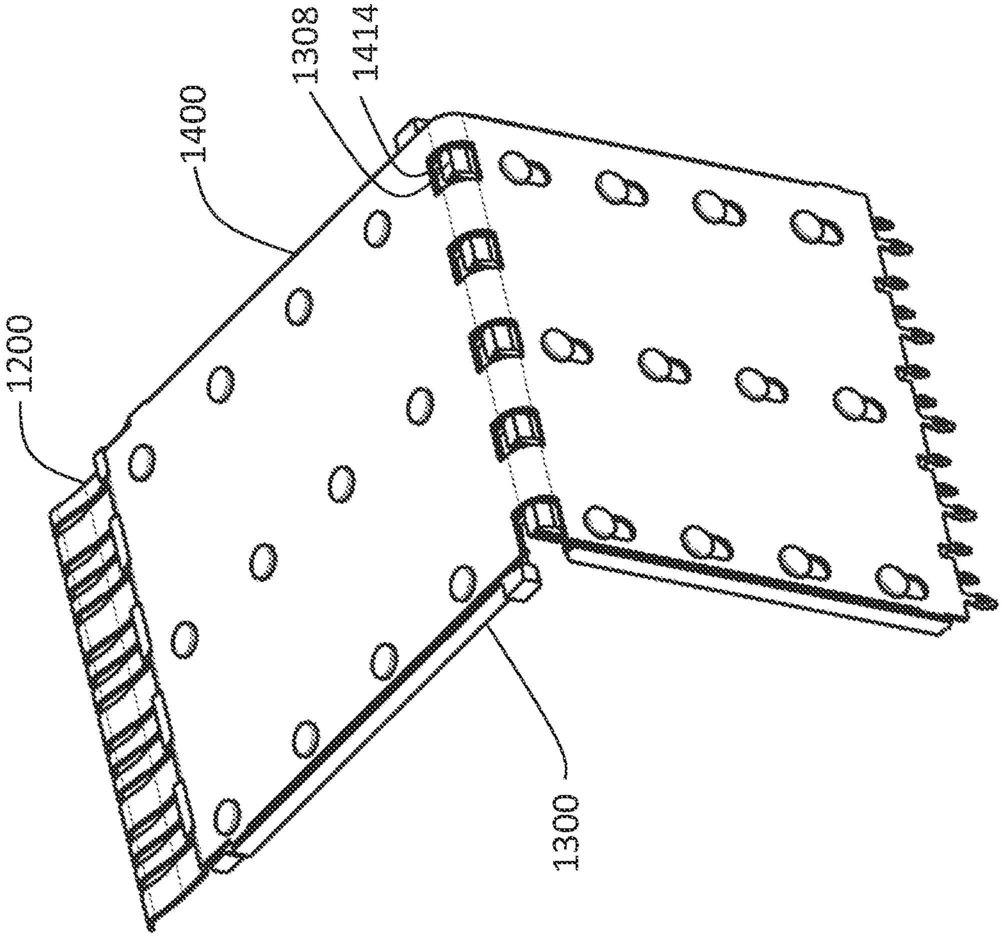
FIG. 4D is a perspective view of a leadframe assembly configured for attaching to an upper surface of a core member, according to some embodiments.

FIGS. 4D-4J illustrate such a leadframe assembly 1100 in accordance with some embodiments. Any or all of the leadframe assemblies as described herein may be manufactured according to the process described in connection with FIGS. 4D-4J. FIG. 4D is a perspective view of the leadframe assembly 1100. The leadframe assembly 1100 may include a leadframe 1200, a leadframe housing 1300 holding the leadframe 1200, and a shield 1400 separate from intermediate portions of the conductive elements of the leadframe 1200 by the leadframe housing 1300. Although the illustrated leadframe assembly 110 may be configured for attaching to an upper surface of a core member, a leadframe assembly for attaching to a lower surface of the core member may be similarly configured with features of the leadframe assembly 1100.

The leadframe 1200 may include conductive elements 1202. FIG. 4E illustrates a perspective view of a leadframe 1200. Similar to the conductive elements 402 of the leadframe assembly 400 shown in FIGS. 4A-4B, the conductive elements 1202 may be made of metal or any other material that is conductive and provides suitable mechanical properties for conductive elements in an electrical connector. In some embodiments, the conductive elements 1202 may be stamped from a metal sheet and initially connected to a carrier strip by tie bars (not shown). When a leadframe housing is molded over them and the tie bars are severed, the conductive elements 1202 may be separated from each other and from the carrier strip.

The conductive elements 1202 may be configured to transmit signals. Each conductive element 1202 may include a mating end 1202A, a mounting end 1202B opposite the mating end, and an intermediate portion extending between the mating end 1202A and the mounting end 1202B. The mating ends 1202A of the conductive elements 1202 may be aligned in a row such that their contact points are aligned in a row 1210. The contact points of the mating ends 1202A of the conductive elements 1202 may be configured to engage with complementary contact points of mating ends of conductive elements of a mating connector (e.g., connector 102). The contact points of the mating ends 1202A of the conductive elements 1202 may physically contact the complementary contact points of the mating ends of the conductive elements of the mating connector. The row 1210 may be in a plane of a mating interface (e.g., mating interface 104) between the two mating connectors. Likewise, the mounting ends 1202B may be aligned in a row 1212, which may be in a plane of the mounting interface (e.g., mounting interface 106) between the connector and a printed circuit board.

The intermediate portion of each conductive element 1202 may include a first segment 1202C adjacent to the mating end 1202A, a second segment 1202D adjacent to the mounting end 1202B, and a transition portion 1202E between the first segment 1202C and the second segment 1202D. The transition portion 1202E may bend through an angle such that the mating end 1202A and the mounting end 1202B extend in directions that differ by that angle. In some embodiments, the transition portion 1202E may bend at a right angle such that the mating end 1202A and the mounting end 1202B extend in directions substantially perpendicular to each other.

The conductive elements 1202 may have features that reduce impedance discontinuities along signal transmission paths along the conductive elements 1202. In some embodiments, the transition portion 1202E may be wider than the first and second segments 1202C, 1202D because the transition portion 1202E may not be overmolded with housing material and therefore may be bent to a desired angle after overmolding the leadframe housing. The lack of the housing material around the transition portion 1202E, however, may cause decreased dielectric constant and might otherwise cause an impedance discontinuity around the transition portion 1202E. Widening the transition portion 1202E may reduce or avoid an impedance discontinuity.

Figure 4F:
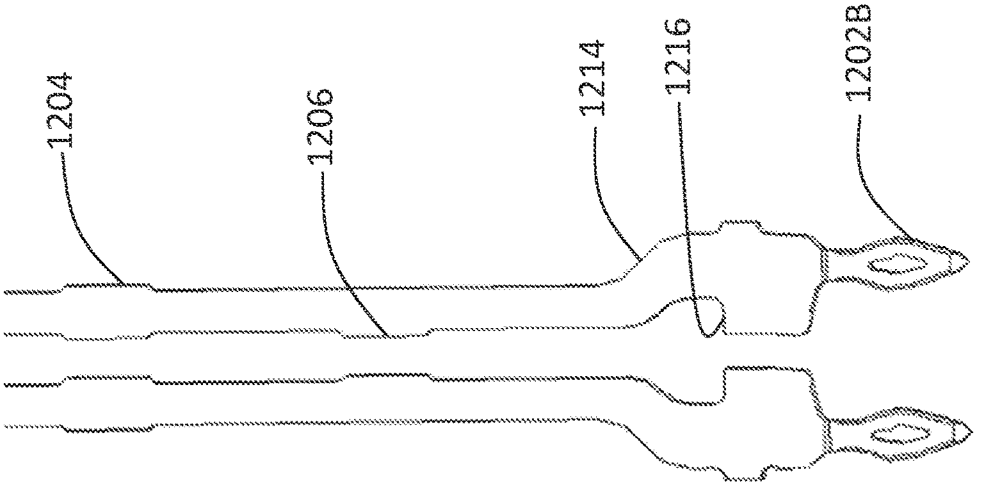
FIG. 4F is an enlarged view of a portion of the leadframe of FIG. 4E within the circle marked "4F" in FIG. 4E, according to some embodiments.
Figure 4E:
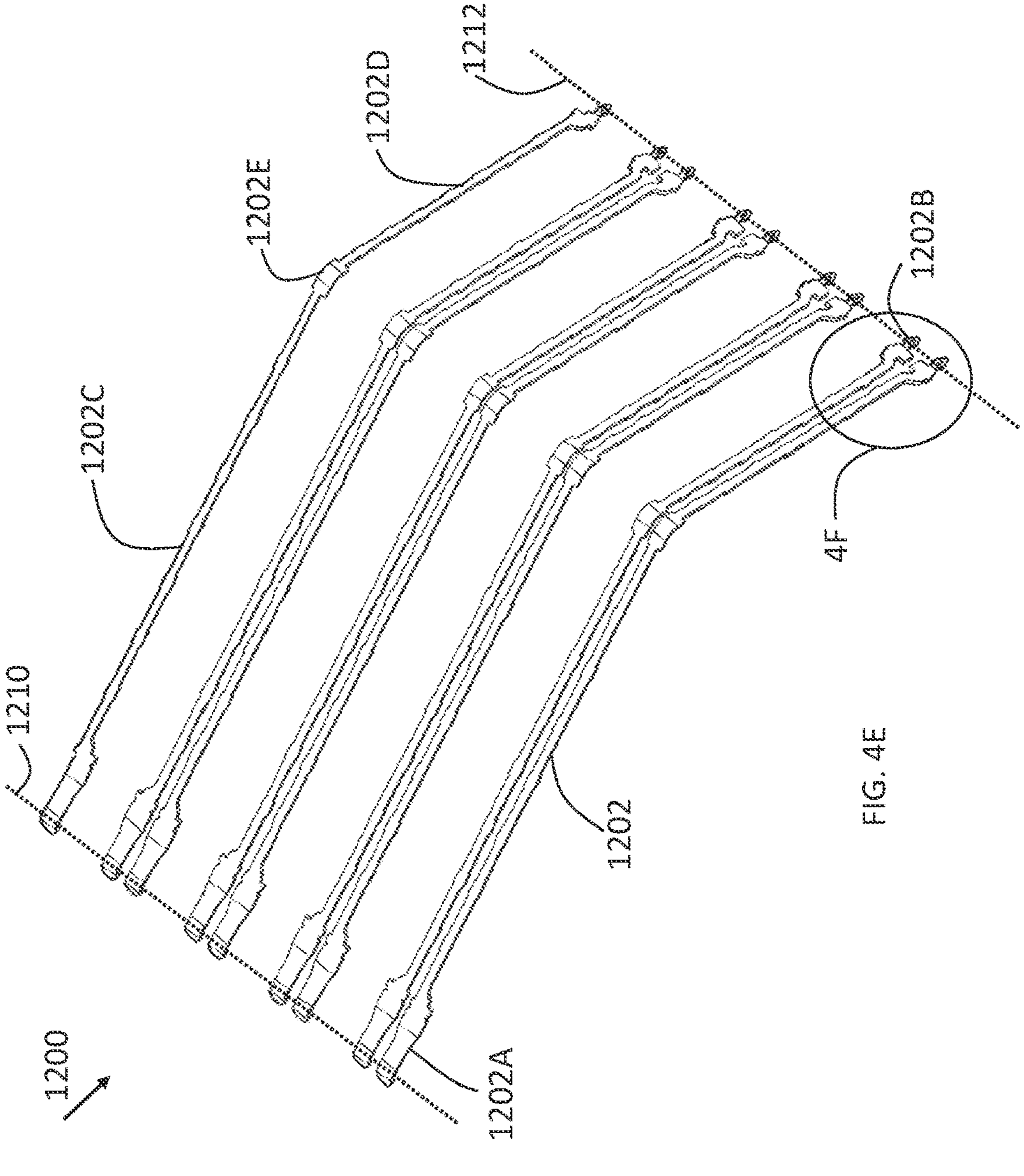
FIG. 4E is a perspective view of a leadframe of the leadframe assembly of FIG. 4D, according to some embodiments.

Additionally or alternatively, as shown in FIG. 4F, which illustrates an enlarged view of a portion of the leadframe 1200 within the circle marked "4F" in FIG. 4E, portions of the first and second segments 1202C, 1202D may be widened to reduce or avoid an impedance discontinuity caused by, for example, exposing these portions for manufacturing processes. In some embodiments, portions 1204 may be exposed because of being adjacent to tie bars before severing the tie bars. In some embodiments, portions 1206 may be exposed because of being pinched between pinch pins when overmolding the leadframe housing material.

In the embodiment illustrated in FIGS. 4E and 4F, pairs of conductive elements 1202 may be configured to transmit a pair of differential signals. The intermediate portions of the conductive elements in each pair may be disposed closely together. The conductive elements of each pair may include transition regions 1214 spreading away from each other such that the mounting ends 1202B may be disposed in a desired pitch. The conductive elements of each pair may include portions 1216 that are wider to compensate the change of distance at the mounting interface and therefore reduce impedance discontinuity at the mounting interface.

Figure 4I:
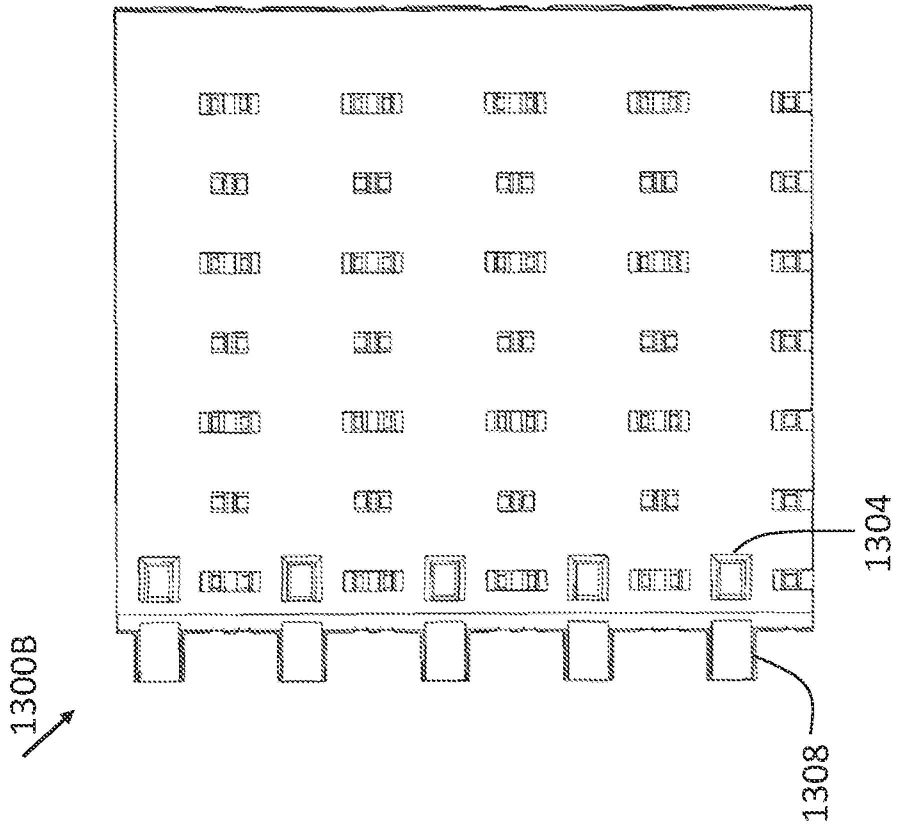
FIGS. 4H-4I are plan views of the leadframe housings of the leadframe assembly of FIG. 4D, showing a side opposite the side with heat stake posts, according to some embodiments.
Figure 4H:
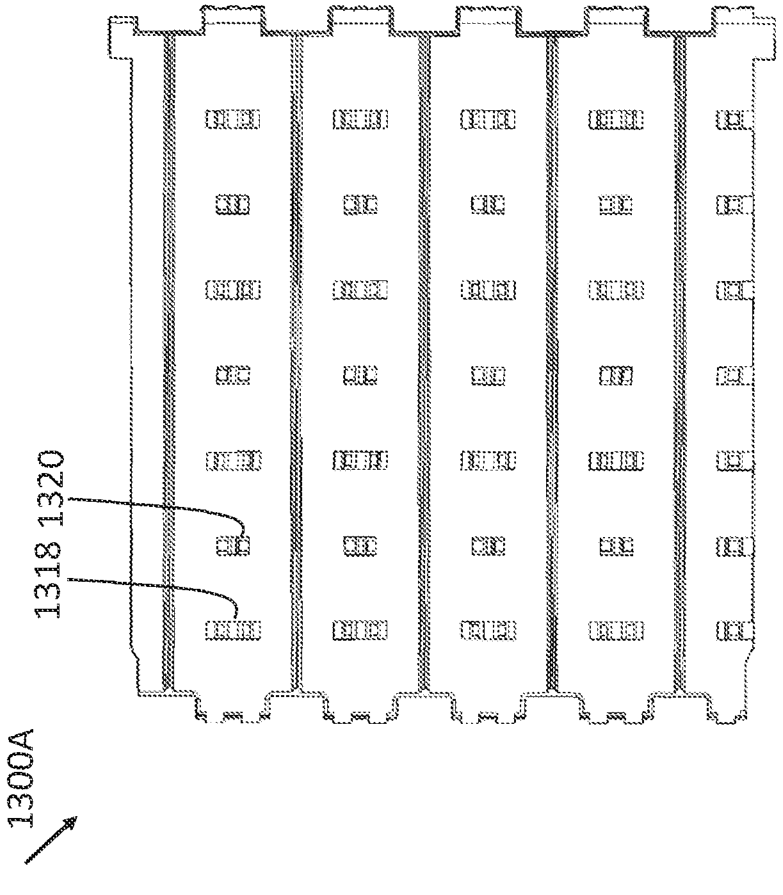

The leadframe housing 1300 may be molded over the leadframe 1200. For simplicity of illustration, neither the leadframe 1200 nor shield 1400 is shown. FIG. 4G1 illustrates a perspective view of the leadframe housing 1300, showing a side with projections 1302A and 1302B. FIG. 4G2 illustrates a perspective view of the leadframe housing 1300, showing the side with projections 1304A and 1304B after heat staking shield 1400 (not shown) to leadframe housing 1300. In this state, the projections 1302A and 1302B have been flattened, which captures shield 1400 against housing 1300. FIGS. 4H-4I are perspective views of the leadframe housing 1300, showing a side opposite the side with the projections.

As illustrated, the leadframe housing 1300 may include a first portion 1300A holding the first segments 1202C of the conductive elements 1202, and a second portion 1300B holding the second segments 1202D of the conductive elements 1202. The first and second portions 1300A and 1300B of the leadframe housing 1300 may be separated from each other so that the transition portions 1202E of the conductive elements 1202 may be exposed and therefore may be bent into an angle after overmolding the leadframe housing 1300. Bending the transition portions 1202E after overmolding the leadframe housing 1300 enables overmolding the leadframe housing 1300 when the portions of the conductive elements 1202 are substantially straight and therefore improves the controllability and accuracy of the overmolding process.

The first portion 1300A of the leadframe housing 1300 may include the projections 1302A, which may extend in a direction substantially perpendicular to a plane that the first portion 1300A extends. The projections 1302A may be disposed in rows 1310, which may be substantially parallel to the row 1210, and in columns 1314, which may be substantially perpendicular to the row 1210. Likewise, the second portion 1300B of the leadframe housing 1300 may include the projections 1302B, which may extend in a direction substantially perpendicular to a plane that the second portion 1300B extends. The projections 1302B may be disposed in rows 1312, which may be substantially parallel to the row 1212, and in columns 1316, which may be substantially perpendicular to the row 1212.

The first portion 1300A of the leadframe housing 1300 may include openings 1318 and 1320. The openings 1318 may separate the projections 1302A in a same row 1310, and may be disposed in columns that may be parallel to the columns 1314. Housing portion 1300A may be molded such that openings 1318 expose tie bars between the portions 1204 of the conductive elements 1202. A punch may pass through openings 1318 to sever the tie bars after the overmolding of the leadframe housing 1300. The openings 1320 may align with portions 1206 of the conductive elements 1202 such that pinch pins of a mold pinch the conductive elements 1202, and therefore hold them in place, when overmolding the leadframe housing 1300. At least of a portion of the openings 1320 may be arranged in pairs, which may correspond to the conductive elements 1202 that are arranged in pairs. The pairs of the openings 1320 may be disposed in rows parallel to the row 1210 and offset from the rows 1310, and between the openings 1318 in a same column. Likewise, the second portion 1300B of the leadframe housing 1300 may include corresponding openings.

The first portion 1300A of the leadframe housing 1300 may include pairs of portions 1322 and 1324 extending from a body of the first portion 1300A in opposite directions. The portions 1322 and 1324 are shown in this example aligned with the columns of the openings 1320 and 1318, which means they are each aligned with a pair of conductive elements 1202 in the leadframe. The portions 1324 may engage with a forward edge of a shield 1400, while providing space for ground mating contacts 1402 to extend from a body of the shield and align with mating contact portions of signal conductive elements 1202. Portions 1322 may align with and support the transition portions 1400C of shield 1400.

Figure 5B:
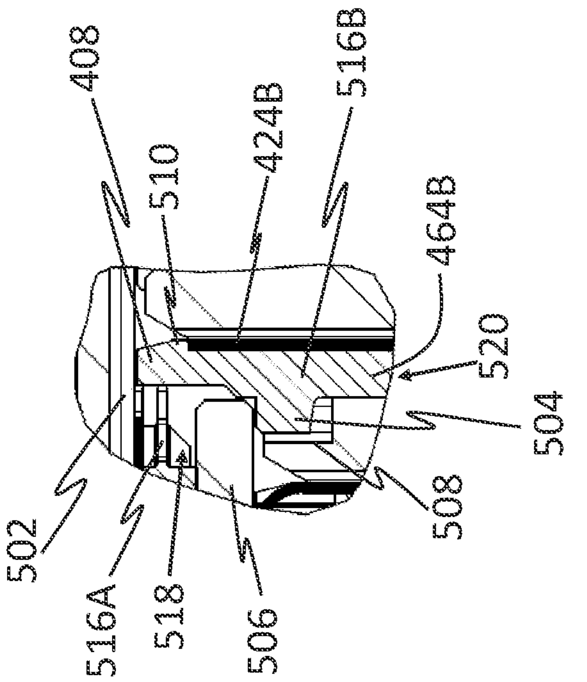
FIG. 5B is an enlarged view of a portion of the right angle orthogonal connector of FIG. 5A within the circle marked as "A" in FIG. 5A, according to some embodiments.
Figure 5A:
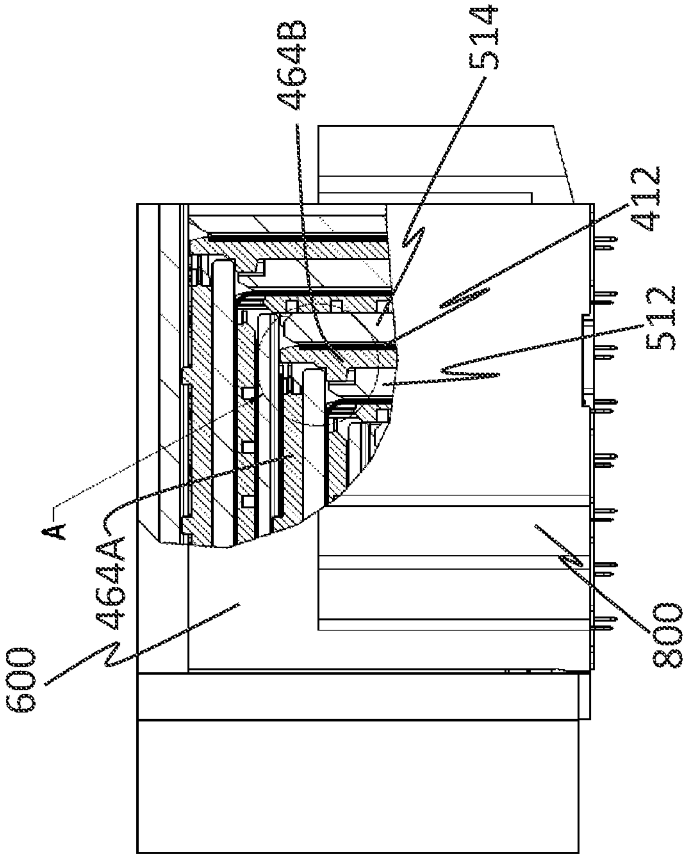
FIG. 5A is an elevation view of the right angle orthogonal connector of FIG. 2A, partially cut away, according to some embodiments.

The second portion 1300B of the leadframe housing 1300 may include member 1308, which may be configured similar to the members 408 (FIGS. 4A-4B). Openings 1306 may be formed between the members 1308. The transition portions 1202E of the conductive elements 1202 may be exposed by the openings 1306. As illustrated in FIG. 4G2, on one side, the second portion 1300B may include the projections 1304B, which may be aligned with the members 1308. As illustrated in FIG. 4I, on an opposite side, the second portion 1300B of the leadframe housing 1300 may include projections 1304, which may be configured similar to the projections 504 (FIGS. 5A-5B).

Figure 4J:
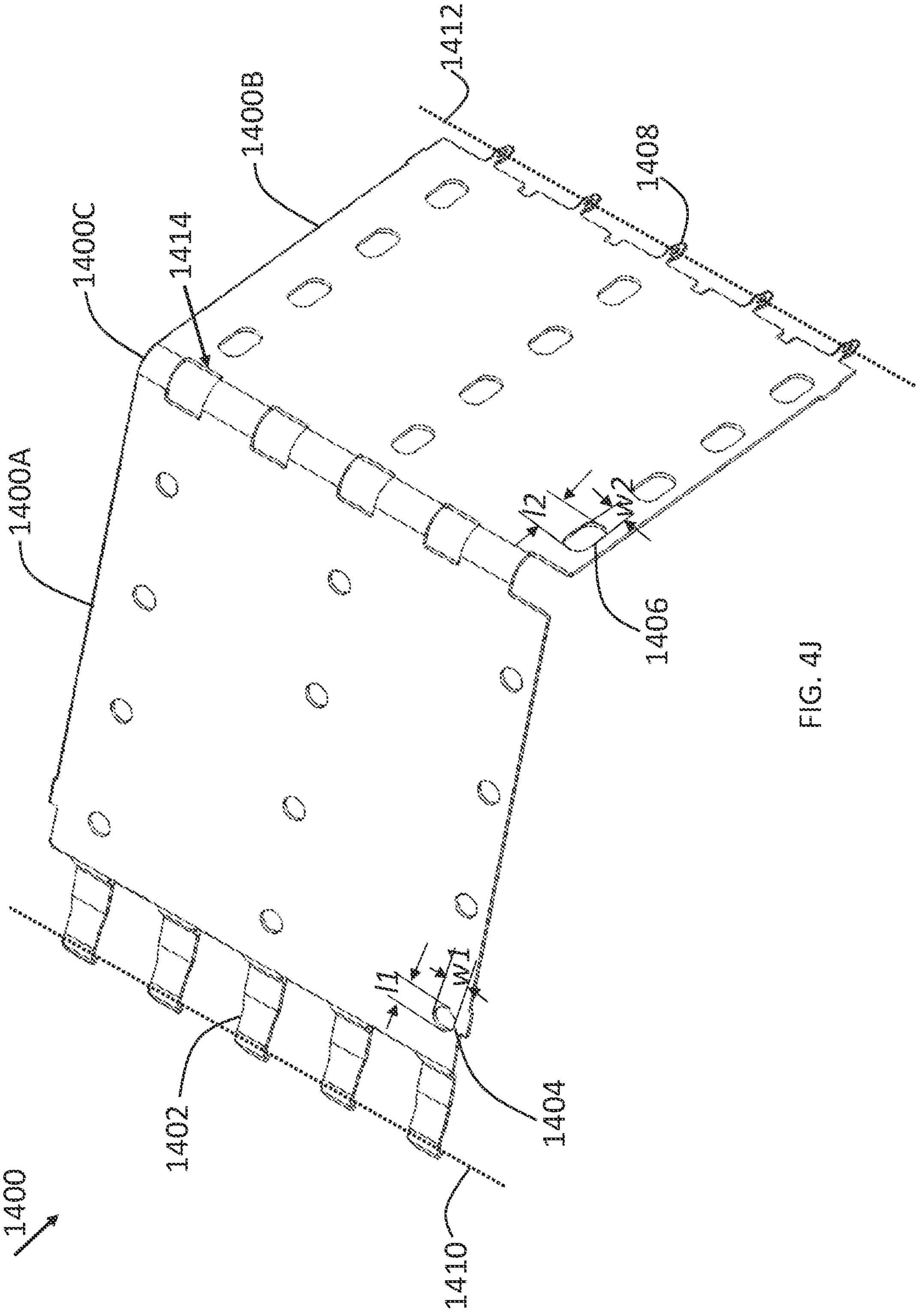
FIG. 4J is a perspective view of a shield of the leadframe assembly of FIG. 4D, according to some embodiments.

The shield 1400 may be assembled to the leadframe housing 1300. FIG. 4J is a perspective view of the shield 1400. The shield 1400 may include a body, and ground mating ends 1402 and ground mounting ends 1408 extending from opposite edges of the body. The ground mating ends 1402 may be aligned in a row such that their contact points are aligned in a row 1410. Like the ground mating ends 412A (FIG. 4A), the ground mating ends 1402 may jog away from a plane that a first portion 1400A of the body of the shield extends such that the ground mating ends 1402 may be aligned with the mating ends 1202A of the conductive elements 1202 in a row. Like the mounting ends 412B (FIG. 4A), the mounting ends 1408 may be aligned in a row 1412, which may be substantially parallel to and offset from the row 1212.

The shield 1400 may include features that enable the row 1410, in which the contact points of the ground mating ends 1402 are aligned, to be in-line with the row 1210, in which the contact points of the mating ends 1202A of the conductive elements 1202 are aligned. In the example illustrated in FIG. 4J, the body of the shield 1400 includes the first portion 1400A, a second portion 1400B, and transition portions 1400C connecting the first and second portions 1400A and 1400B. Openings 1414 may be formed between the transition portions 1400C and configured to have the members 1308 passing through. The first portion 1400A of the shield 1400 may include openings 1404, which may be configured to have the projections (e.g., 1302A, 1304A) of the first portion 1300A of the leadframe housing 1300 extending therethrough. The second portion 1400B of the shield 1400 may include openings 1406, which may be configured to have the projections (e.g., 1302B, 1304B) of the second portion 1300B of the leadframe housing 1300 extending therethrough.

The locations of the openings 1404 and the openings 1406, as well as the locations of the projections of the leadframe housing 1300, may be selected to limit the amount of electromagnetic radiation radiating from or impinging on signal conductive elements in the leadframe assembly passing through shield 1400. Openings 1404 and 1406, for example, may be approximately half way between adjacent pairs of signal conductive elements. In some embodiments, the openings 1404 and the openings 1406 may be disposed in columns that are aligned with the mating ends 1402 and the mounting ends 1408, respectively. Additionally, through the engagement of the projections and openings, movement of the mating ends 1402 and the mounting ends 1408 may be reduced during mating and unmating, and/or mounting and unmounting.

In some embodiments, the openings 1404 and the openings 1406 may be of different sizes. In some embodiments, the openings 1404, before heat staking, may be completely filled by the projections of the first portion 1300A of the leadframe housing 1300, and the openings 1404 may be partially filled by the projections of the first portion 1300A of the leadframe housing 1300. In some embodiments, the openings 1404 may be circular, and the openings 1406 may be elongated. In some embodiments, the openings 1404 may have a width w1 in a first row direction that may be substantially parallel to the row 1410, and a length l1 in a direction that may be substantially perpendicular to the first row direction. The openings 1406 may have a width w2 in a second row direction that may be substantially parallel to the row 1412, and a length l2 in a direction that may be substantially perpendicular to the second row direction. In some embodiments, the width w1 and the width w2 may be equal to each other. In some embodiments, the length l2 may be longer than the length l1.

FIGS. 4AA-4AD2 illustrate a method of manufacturing the leadframe assembly 1100, which may include affixing the shield 1400 to the leadframe housing 1300 holding the leadframe 1200, according to some embodiments. FIG. 4AA illustrates the leadframe 1200 held by the leadframe housing 1300. FIG. 4AB illustrates shield 1400 moved into a position in which the projections 1302B of the second portion 1300B of the leadframe housing 1300 are aligned with a first portion of the openings 1406 of the second portion 1400B of the shield 1400.

FIGS. 4C1 and 4C2 illustrate pressing the second portion 1400B of the shield against the second portion 1300B of the housing. In this state, the projections 1302B of the second portion 1300B of the leadframe housing 1300 extend into the openings 1406 of the second portion 1400B of the shield 1400. Projections 1302B occupy the first portion of the openings 1406. In the orientation illustrated in FIG. 4AC2, that first portion is the lower portion of openings 1406.

FIGS. 4D1 and 4D2 illustrates moving the shield 1400 such that first portion 1400A is pressed against the first housing portion 1300A. With this movement of shield 1400, the projections 1302B of the second portion 1300B of the leadframe housing 1300 slide in the openings 1406 of the second portion 1400B of the shield 1400 and occupy a second portion of the openings. Concurrently, the projections 1302A of the first portion 1300A of the leadframe housing 1300 enter openings 1404 of the first portion 1400A of the shield 1400. Moving shield 1400 may also enable the members 1308 of the leadframe housing 1300 to abut edges of the openings 1414 of the shield 1400. In some embodiments, the leadframe housing 1300 may be moved instead of moving the shield 1400. In some embodiments, the leadframe housing 1300 and the shield 1400 may both be moved.

Subsequently, projections 1302A and 1302B may be collapsed into the projections 1304A and 1304B. Projections 1304A and 1304B have distal portions 1332 that are too large to pass through the openings 1404 and 1406, respectively. In this way, the shield 1400 is secured to the leadframe housing 1300. The projections 1302A and 1302B may be collapsed into projections 1304A and 1304B by application of energy to projections 1302A and 1302B that softens the insulative material forming projections 1302A and 1302B. Energy may be applied as heat or ultrasound, for example. In some embodiments, pressure may be applied to the softened insulative material to change their shape. This process of softening and deforming a projection of one component to secure a second component to it is sometimes referred to as heat staking.

In some embodiments, the shield 1400 may be held against the insulative housing during the application of heat and/or pressure to ensure that, following the heat staking operation, the shield is affixed against the housing in a repeatable and desired position. In the illustrated embodiment, both the first and second portions 1400A and 1400B of the shield are affixed to the first and second portions 1300A and 1300B of the insulative housing.

In the illustrated embodiment, the shield may be positioned relative to the leadframe housing based on cooperating features of the shield and insulative housing. For example, a forward edge of shield 1400 may be positioned by portions 1324 of the insulative housing. Alternatively or additionally, the first portion 1400A of the shield may be positioned by a tight fit between openings 1404 and projections 1302A. Alternatively or additionally, manufacturing tools may be used to ensure a position of the shield with respect to the leadframe housing that provides alignment of the mating contact portions of the signal conductors and ground conductors, for example.

The described technique enables the shield of a leadframe assembly to be attached to the leadframe housing after the leadframe and shield have been bent to a desired angle. Such a method of manufacture may result or more accurate and repeatable positioning of the shield with respect to the signal conductors of the leadframe. In some embodiments, the order of steps may be reversed, with the leadframe and shield being bent to a desired angle after the shield is heat staked to the leadframe housing.

The connector structures may include the members 408 of the leadframe housing 464 and additional features illustrated in FIG. 5A and FIG. 5B to reduce shifting of the signal and ground structures under forces that may occur during mounting of the connector. FIG. 5A is an elevation view of the right angle orthogonal connector 200, partially cut away, according to some embodiments. FIG. 5B is an enlarged view of a portion of the right angle orthogonal connector 200 within the circle marked as "A" in FIG. 5A, according to some embodiments.

A horizontal portion 516A of the leadframe assembly 400 may be held in a slot 518 between separators 502 and 506 of the front housing 600. A vertical portion 516B of the leadframe assembly 400 may be held in a slot 520 between separators 512 and 514 of the rear housing 800. The spacing between the portions of the leadframe assemblies in slots 518 and 520 may be controlled by the spacing of these slots. Within these regions, the spacing between signal conductive elements and their respective leadframe shields may be controlled by the thickness of the leadframe housing. Other features may be included to control the spacing between signal conductive elements and their respective leadframe shields at the transition between these two segments of the leadframe assemblies.

The member 408 of the leadframe housing 464B may extend out of the opening 414 of the ground shield 412, and make contact with the separator 502 of the front housing 600. The member 408 may include a shoulder 510 extending beyond the second portion 424B of the ground shield 412. Portions of the second portion 424B of the ground shield 412 may be blocked by the shoulder 510 of the member 408 from moving relative to the signal conductive elements that are also held in position by the leadframe housing portion 464B. As a result, impedance of the signal conductive elements is maintained with high uniformity throughout the intermediate portions of the signal conductors, even in the transition regions between vertical and horizontal portions. The impedance may vary, for example, by less than 1% or less than 0.5%, in some embodiments. The impedance variation for a differential pair of signal conductors, for example, may be less than 1 Ohm or less than 0.5 Ohm, for example Other features may alternatively or additionally be included to transfer a downward force on the connector housing to portions of the leadframe housing that fix the position of signal conductive elements and leadframe shields. The leadframe housing 464B, for example, may include a projection 504 extending perpendicular to the member 408. The projection 504 may press against a lower surface of separator 506 of the front housing 600. The separator 512 of the rear housing 800 may include a recess 508 sized and positioned to accommodate the projections 504. In this way, the leadframe housing of one leadframe assembly may make contact with the front housing 600 of the connector at multiple locations. Here, contact is made with separators in the front housing positioning two adjacent leadframe assemblies. As a result, relative positioning of the components of the leadframe assemblies may be reliably maintained, despite forces applied to the connector in use.

FIG. 5A illustrates connector structures that make the generated forces bypass the bent regions in every other leadframe assembly 400. Some or all of the leadframe assemblies 400 in a connector may have such structures. FIG. 5A, for example, illustrates a cross section through a portion of a row aligned with the member 408 of every other leadframe assembly. That portion may correspond, for example, to a member 408 of a leadframe assembly 450 (FIG. 4C). As can be seen from a comparison of FIGS. 4A and 4C, the locations, within a row, of the members 408 may be offset, reflecting the offset in locations of signal conductors between the leadframe assemblies with upwardly facing contact surfaces and those with downwardly facing contact surfaces. In such an embodiment, other cross sections parallel to the cross section illustrated in FIGS. 5A and 5B may reveal structures that make the generated forces bypass the bent regions of conductors in leadframe assemblies with downwardly facing contact surfaces.

In some embodiments, the leadframe assemblies in a connector may have Type-A and Type-B configurations corresponding, for example the leadframe assemblies 472A, 474A, 476A or 478A and leadframe assemblies 472B, 474B, 476B or 478B. The ground mating ends of a Type-A leadframe assembly may be configured to face the signal mating ends of a Type-B leadframe assembly so as to reduce row-to-row cross talk, and decrease the rate of assembly mistakes. The members 408 may be aligned with the ground mating ends in a direction perpendicular to the row 210. The members 408 and structures corresponding to the members 408 (e.g., the projections 504, and the recesses 508) of a Type-A leadframe may be offset, in the row direction, from a Type-B leadframe assembly. Such configuration makes the applied forces bypass the bent regions at offset locations and enhances the structural stability of the connector.

Figure 6:
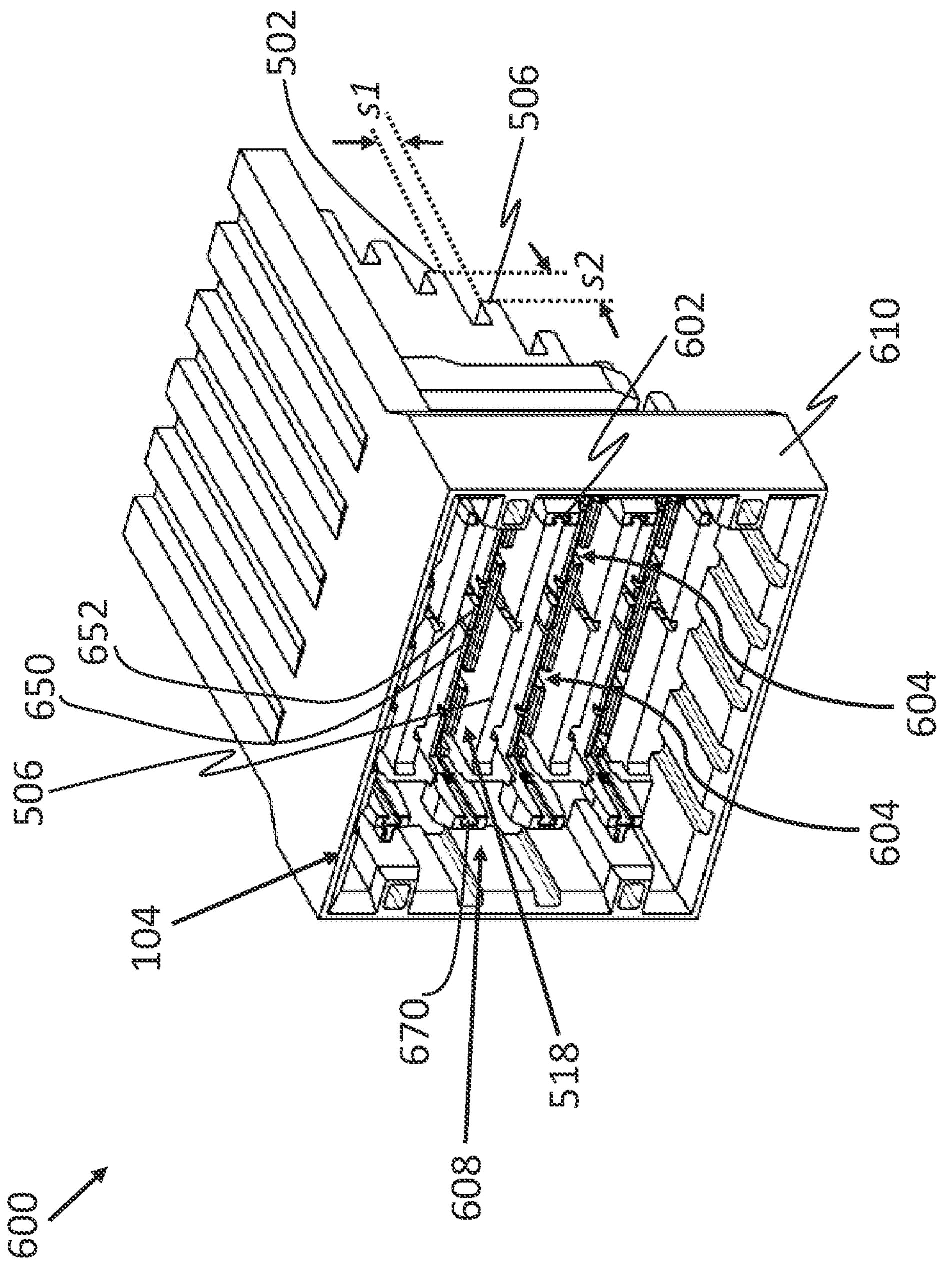
FIG. 6 is a perspective view of a front housing of the right angle orthogonal connector of FIG. 2A, according to some embodiments.

FIG. 6 depicts a perspective view of the front housing 600 of the right angle orthogonal connector 200, according to some embodiments. The front housing 600 may include a cavity 608 enclosed by a frame 610. Frame 610 may bound the mating region of the connector 200 and may receive a mating region of a second connector, such as connector 102 (FIG. 1).

A rear of front housing 600 may be divided into slots (e.g., slot 518) by separators (e.g., separators 502 and 506). The separators may extend reward from the frame 610. The slots may align the horizontal portions of the leadframe assemblies 400 as the assemblies are inserted from the back of the front housing 600, opposite the mating interface 104. Forward ends of the separators 502 and 506 may be exposed in cavity 608 and may be shaped to engage with the core members 300.

In the illustrated embodiment, pairs of leadframe assemblies, such as 472A and 472B, or 474A and 474B, or 476A and 476B, or 478A and 478B have mating portions aligned with the same core member 300. Accordingly, every other separator, corresponds to one core member. A forward edge of every other separator, such as separator 502, for example, may be shaped with the features of cross pieces 650 so as to engage with a core member.

The front housing 600 may include members 602 configured with grooves 670 to receive the dovetails 312 of the core members 300. Barbs 314 may engage the front housing within grooves 670, restraining the core member from being separated from front housing 600 after insertion. The members 602 may align the core members with respective separators (e.g., separator 502) as the core members are inserted from the front of the front housing 600. Separators 502 that align with respective core members 300 may include structures to receive retention features 308 of the core members 300. Further, openings 604 may be configured to receive hooks 310 so as to enable the contact portion 316 of the hooks 310 to contact a surface of a leadframe shield adjacent opening 604.

The adjacent separators may be spaced from each other in a direction perpendicular to the mating direction by a distance s1. The distance s1 may be configured to correspond to the row-to-row pitch p1 (FIG. 2A). The adjacent separators may be offset from each other in the mating direction by a distance s2. The distance s2 may be configured to correspond to the row-to-row pitch p2 (FIG. 2B).

Figure 7B:
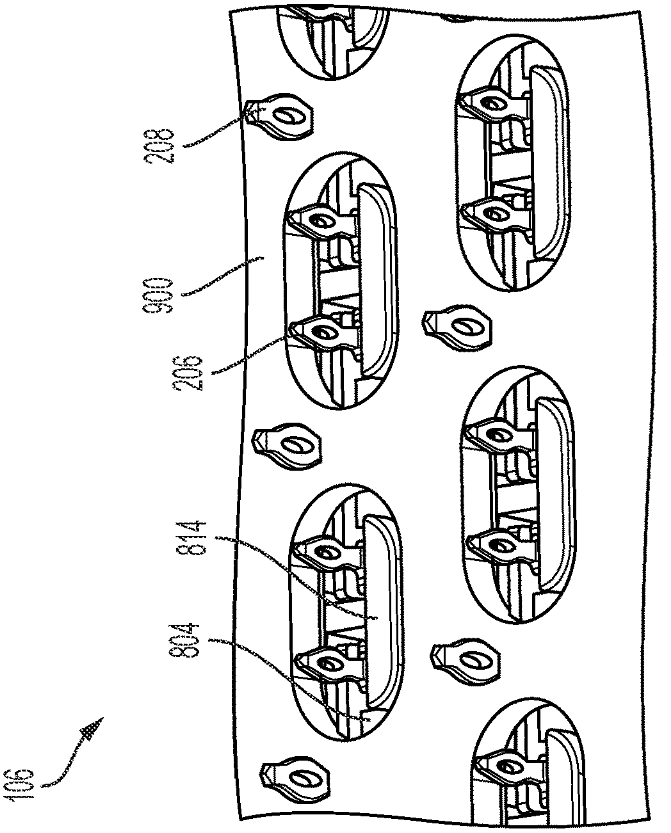
FIG. 7B is an enlarged view of a portion of the mounting interface of the right angle orthogonal connector within the circle marked as "7B" in FIG. 2B, according to some embodiments.
Figure 7A:
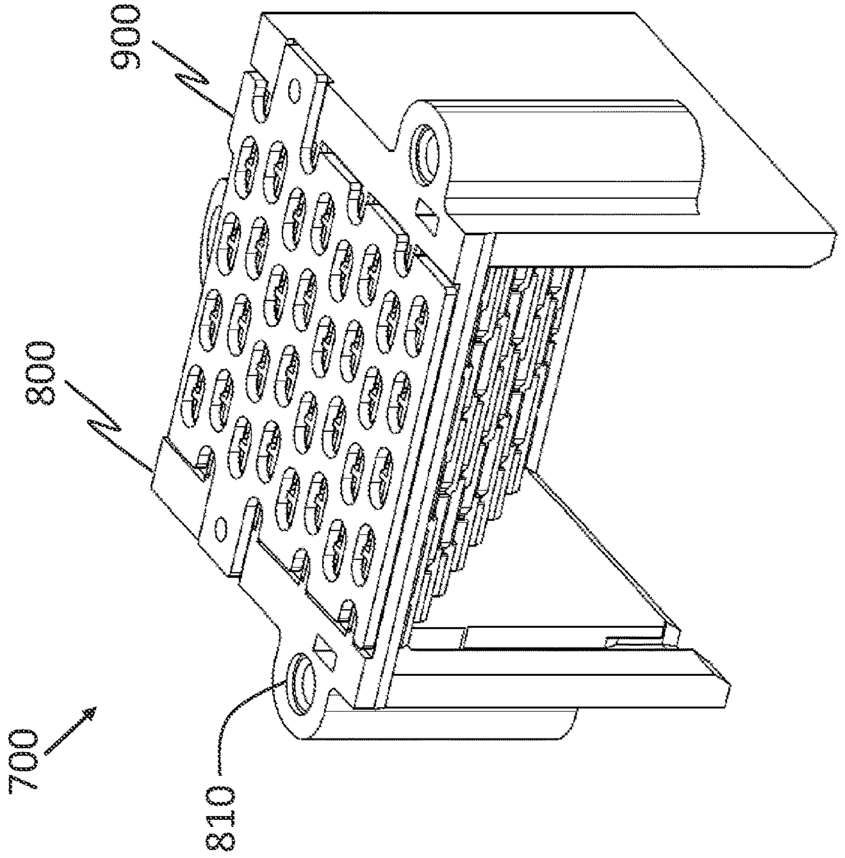
FIG. 7A is a perspective view of a portion of the right angle orthogonal connector of FIG. 2A, illustrating a rear housing and a mounting interface shield, according to some embodiments.

FIG. 7A depicts a perspective view of a portion of the right angle orthogonal connector 200, illustrating the rear housing 800 and the compressible shield 900, according to some embodiments. In the illustrated embodiment, rear housing 800 includes separators, as with front housing 600. The separators of the rear housing, however, are perpendicular to the separators of the front housing when the first and rear housings are engaged. Slots between the separators of the rear housing similarly position portions f the leadframe assemblies. In this example, the separators of the rear housing aid in positioning the vertical portions of the leadframe assemblies.

Figure 8B:
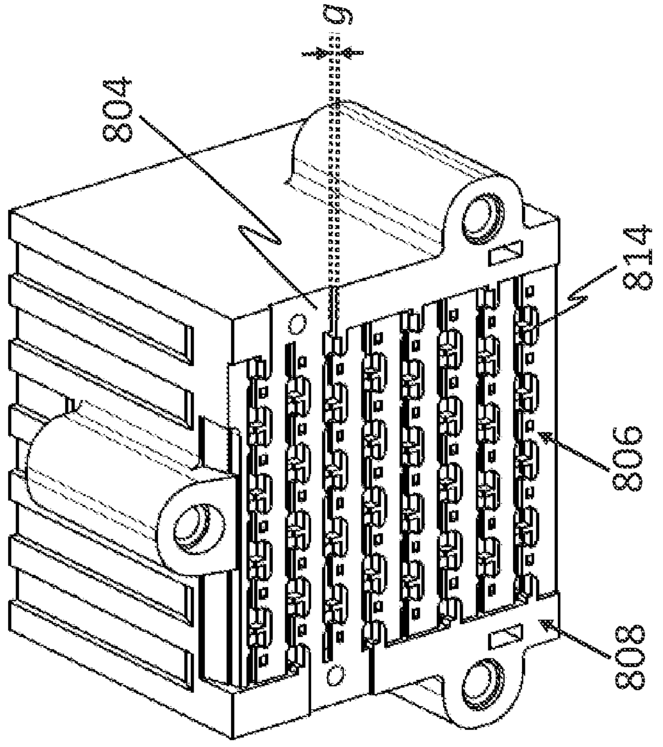
FIG. 8B is a perspective view of the rear housing of FIG. 8A, illustrating a mounting end, according to some embodiments.
Figure 8A:
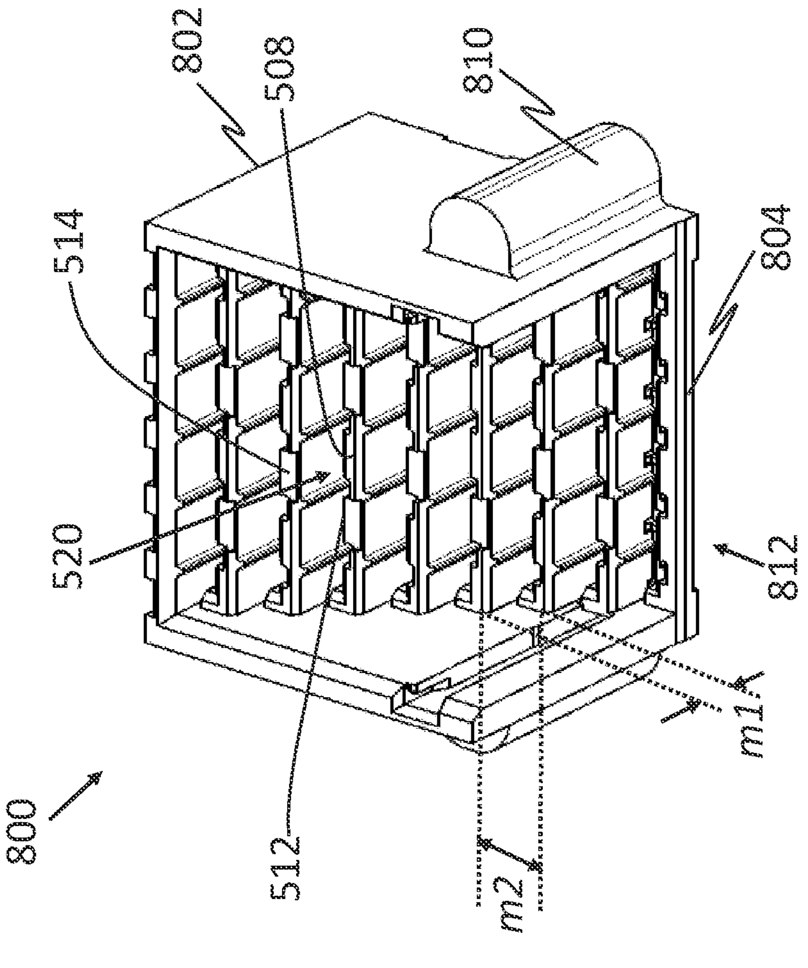
FIG. 8A is a perspective view of the rear housing of FIG. 7A, illustrating a receiving end for leadframe assemblies, according to some embodiments.

FIG. 7B is an enlarged view of a portion of the mounting interface 106 of the right angle orthogonal connector 200 within the circle marked as "7B" in FIG. 2B, according to some embodiments. FIG. 8A is a perspective view of the rear housing 800, illustrating a receiving end for leadframe assemblies, according to some embodiments. FIG. 8B is a perspective view of the rear housing 800, illustrating a mounting end, according to some embodiments.

The rear housing 800 may include a body portion 802 and an organizer 804 at the mounting face of the rear housing. The body and organizer may be integrally formed, such as may result from forming the entire rear housing in a molding operation. The body portion 802 of the rear housing 800 may include an opening end 812 configured to be closed by the front housing 600 when the front housing and rear housing are engaged. The body portion 802 of the rear housing 800 may include slots (e.g., slot 520) divided by separators (e.g., separators 512 and 514). The separators may include recesses 508 sized and positioned to form spaces with respective separators of the front housing 600.

The adjacent separators may be offset from each other in a direction perpendicular to the mating direction by a distance m1. The distance m1 may be configured to correspond to the row-to-row pitch p1 (FIG. 2A). The adjacent separators may be spaced from each other in the mating direction by a distance m2. The distance m2 may be configured to correspond to the row-to-row pitch p2 (FIG. 2B).

The organizer 804 may be configured to receive mounting ends of the leadframe assemblies. The organizer 804 may include standoffs 814 configured to separate adjacent signal mounting ends and prevent the adjacent signal mounting ends from accidentally making contact.

In some embodiments, the body portion 802 and the organizer 804 are molded separately and assembled together. In some embodiments, the body portion 802 and the organizer 804 are molded as a single component.

In some embodiments, a lower face of organizer 804 may have a recess 806, which may be recessed, by a distance g, from a plane defined by the lower-most surface 808 of the body portion 802 of the rear housing 800. In some embodiments, the compressible shield 900 may be shaped to partially fit with the recessed surface 806. Between 50-75% of the compressible shield 900 may fit within the recess 806, for example. Between 20-50% or 30-40% in some embodiments, of the compressible shield 900 may extend beyond the lower-most surface 808 when the connector 200 is not attached to a board. When connector 200 is mounted on a printed circuit board, the extending portions of compressible shield 900 may be compressed, ensuring that electrical connection is made to conductive surfaces on the printed circuit board.

Connector 200 may include or be used with features that hold the connector 200 against a surface of a board with compressible shield 900 compressed. Pressfits of the signal conductive elements and leadframe shields may provide some retention force. In other retention force may be provided by or augmented by fasteners. In some embodiments, the body portion 802 of the rear housing 800 may include screw receivers 810, which may be configured to be attached to a board by screws (e.g., thread forming screws).

Figure 9B:
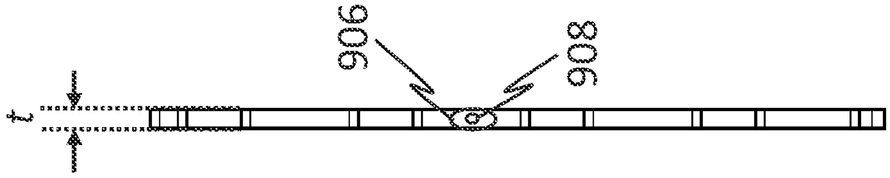
FIG. 9B is a side view of the mounting interface shield of FIG. 9A, according to some embodiments.
Figure 9A:
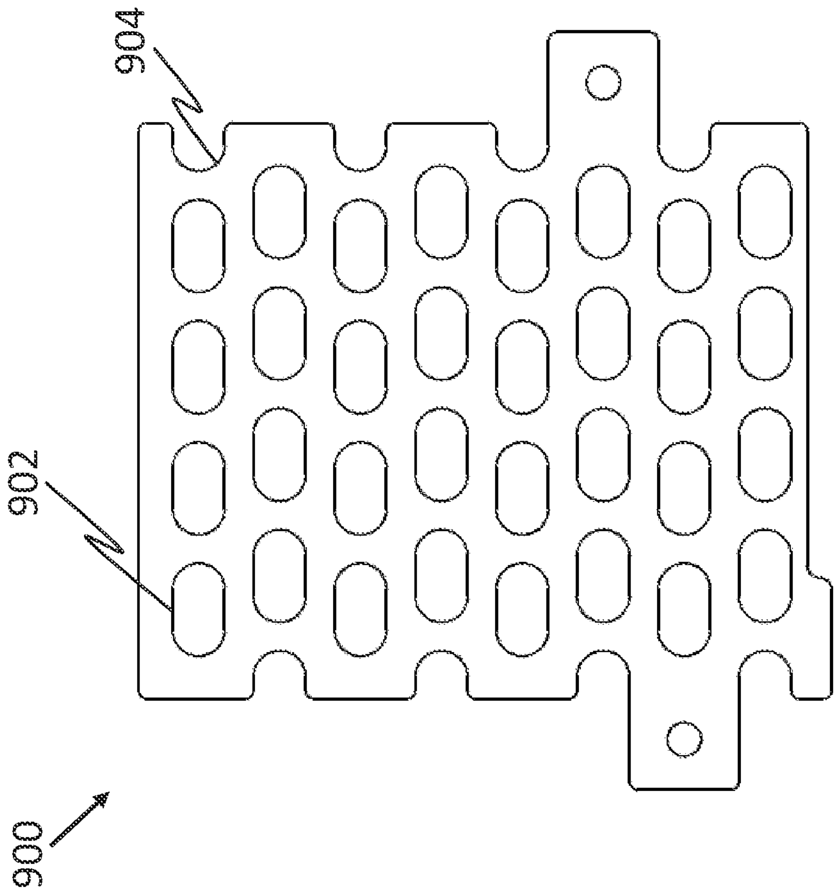
FIG. 9A is a top, plan view of the mounting interface shield of FIG. 7A, according to some embodiments.

FIG. 9A depicts a top, plan view of the compressible shield 900, according to some embodiments. FIG. 9B depicts a side view of the compressible shield 900, according to some embodiments. The compressible shield 900 may include openings 902 configured for signal mounting ends to pass therethrough. The compressible shield 900 may include notches 904 configured for signal mounting ends at the ends of columns to pass therethrough.

In some embodiments, the compliant shield 900 may be made from a sheet of a foam material by selectively cutting the sheet or otherwise removing material from the sheet to form openings 902 and recesses 904. Alternatively or additionally, the foam may be molded in a desired shape. In some embodiments, the compliant shield 900 may include only openings 902 and recesses 904 configured for signal mating ends to pass therethrough. Ground mating ends may pierce through the compliant shield 900 when the compliant shield 900 is assembled to the connector 900, which simplifies the manufacturing process of the compliant shield. Alternatively or additionally, slits may be cut in compliant shield 900 to facilitate ground mating ends passing through the compliant shield. Ground mating ends passing through the compliant shield 900 may be electrically connected to it, whereas mounting ends of signal conductive elements may be electrically insulated from it.

In an uncompressed state, the compliant shield may have a first thickness t. In some embodiments, the first thickness t may be larger than the recess distance g. In some embodiments, the first thickness may be about 20 mil, or in other embodiments between 10 and 30 mils. In some embodiments, the first thickness t may be greater than the gap between the mounting end of the internal shields of the connector and the mounting surface of the PCB. Because the first thickness of the compliant shield is greater than the gap, when the connector is pressed onto a PCB engaging the contact tails, the compliant conductive member is compressed by a normal force (a force normal to the plane of the PCB). As used herein, "compression" means that the material is reduced in size in one or more directions in response to application of a force. In some embodiments, the compression may be in the range of 3% to 40%, or any value or subrange within the range, including for example, between 5% and 30% or between 5% and 20% or between 10% and 30%, for example. Compression may result in a change in height of the compliant shield in a direction normal to the surface of a printed circuit board (e.g., the first thickness).

The compression of the compliant shield can accommodate a non-flat reference pad on the PCB surface. In some embodiments, the compression of the compliant shield may cause lateral forces within the compliant shield that laterally expand the compliant shield to press against the surfaces of the internal shields and/or the ground contact tails. In this manner, the gap between the mounting end of the internal shields of the connector and the mounting surface of the PCB can be avoided.

In some embodiments, a reduction in size of a compliant shield may result from displacement of the material. In some embodiments, the change in height in one dimension may result from a decrease in volume of the compliant shield, such as when the compliant shield is made from an open-cell foam material from which air is expelled from the cells when a force is applied to the material. The cells 906 of the foam may be open sideways (e.g., openings 908) such that the thickness of the foam may be adjusted with respect to the gap between the mounting ends of the ground shields and the mounting surface of the PCB when the connector is pressed onto the PCB. In some embodiments, foam material may be formed of cells 906. It should be appreciated that although a single cell is shown for illustration purpose, the present application is not limited in this regard.

In some embodiments, a compliant shield may be configured to fill the gap with a force between 0.5 gf/$mm^2$ and 15 gf/$mm^2$, such as 10 gf/$mm^2$, 5 gf/$mm^2$, or 1.4 gf/$mm^2$. A compliant shield made of an open-cell foam may require a lower application force to fill the gap than that a compliant shield made of rubber may require, for example, two to four times lower application force. In some embodiments, an open-cell foam, compliant shield may require 2 pound-force per square inch (psi) to exhibit a reduction in size substantially similar to that a rubber, compliant shield may require 4 psi to exhibit. Further, different from a rubber, compliant shield, which may reduce in one dimension (e.g., a dimension normal to the plane of the PCB) but correspondingly expand in other dimensions (e.g., a dimension parallel to the plane of the PCB), an open-cell foam, compliant shield may change in one dimension (e.g., a dimension normal to the plane of the PCB) while substantially maintain its dimensions in other dimensions (e.g., a dimension parallel to the plane of the PCB). As a result, the open-cell foam, compliant shield may avoid the risk to inadvertently short to adjacent signal tails.

A suitable compliant shield may have a volume resistivity between 0.001 and 0.020 Ohm-cm. Such a material may have a hardness on the Shore A scale in the range of 35 to 90. Such a material may be a conductive elastomer, such as a silicone elastomer filled with conductive particles such as particles of silver, gold, copper, nickel, aluminum, nickel coated graphite, or combinations or alloys thereof. Alternatively or additionally, such a material may be a conductive open-cell foam, such as a Polyethylene foam or a Polyurethane foam, plated with conductive material (e.g., silver, gold, copper or nickel) within the cells and/or on the outside of the cells. Non-conductive fillers, such as glass fibers, may also be present.

Alternatively or additionally, the complaint shield may be partially conductive or exhibit resistive loss such that it would be considered a lossy material as described herein. Such a result may be achieved by filling all or portions of an elastomer, an open-cell foam, or other binder with different types or different amounts of conductive particles so as to provide a volume resistivity associated with the materials described herein as "lossy." In some embodiments a compliant shield may be die cut from a sheet of conductive complaint material having a suitable thickness, electrical, and other mechanical properties. In some embodiments, the compliant shield may have an adhesive backing such that it may stick to the plastic organizer. In some implementations, a compliant shield may be cast in a mold.

Figure 10:
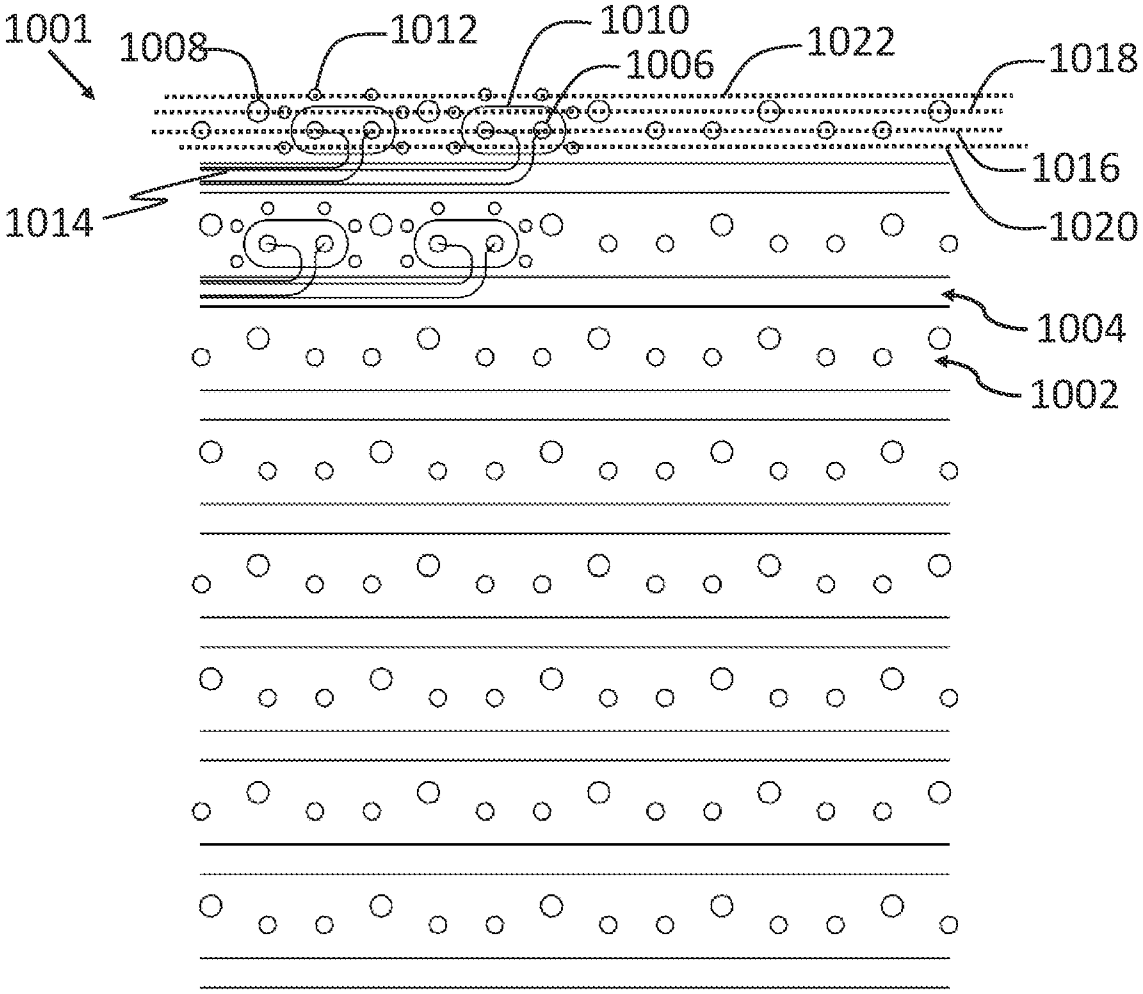
FIG. 10 is a top, plan view of a footprint for the right angle orthogonal connector of FIG. 2B, according to some embodiments.

FIG. 10 depicts a top, plan view of a footprint 1001 on a surface of the printed circuit board 1000 for the right angle orthogonal connector 200, according to some embodiments. The footprint 1001 may include columns of footprint patterns 1002 separated by routing channels 1004. A footprint pattern 1002 may be configured to receive mounting structures of a leadframe assembly 400, including vias to receive mounting ends of signal conductive elements of the leadframe assembly and mounting ends of a leadframe shield.

The footprint pattern 1002 may include signal vias 1006 aligned in a column 1016 and ground vias 1008 aligned to a column 1018. The ground vias 1008 may be connected to a ground plane at an inner layer of the printed circuit board 1000. The column 1018 may be offset from the column 1016 because the ground vias 1008 may be configured to receive ground mating ends 412B that extends from a ground shield 412 without jogging (FIG. 4A).

The signal vias 1006 may be configured to receive signal mating ends (e.g., mating ends 402B). The signal vias 1006 may be surrounded by respective anti-pads 1010 formed in the ground planes of the PCB. Each anti-pad 1010 may surround a respective signal via such that it can prevent the electrically conductive material of a ground layer of the PCB from being placed in electrical communication with the electrically conductive surface of the respective ones of the signal vias. In some embodiments, a differential pair of signal conductive elements may share one anti-pad.

The via pattern 1002 may include shadow vias 1012 configured to enhance electrical connection between internal shields of the connector to the ground structure of the PCB, without receiving ground contact tails. In some embodiments, the shadow vias may be compressed against by the compliant shield 900 and/or may connect to a surface ground plane of the PCB.

In the illustrated example, a first portion of the shadow vias 2010 are aligned in a row 1016. Each row 1016 of signal vias 1006 has two rows 1016 of shadow vias 1016 on opposite sides. A second portion of the shadow vias 2020 are aligned in a row 1012. The shadow vias in the second portion are aligned with respective signal vias in a direction perpendicular to the row 1016.

It should be appreciated that although some structures such as the antipads 1010, interconnections 1014, and shadow vias 1012 are illustrated for some of the signal vias 1006, the present application is not limited in this regard. For example, each signal via may have corresponding breakouts such as interconnections 1014.

Although details of specific configurations of conductive elements, housings, and shield members are described above, it should be appreciated that such details are provided solely for purposes of illustration, as the concepts disclosed herein are capable of other manners of implementation. In that respect, various connector designs described herein may be used in any suitable combination, as aspects of the present disclosure are not limited to the particular combinations shown in the drawings.

Having thus described several embodiments, it is to be appreciated various alterations, modifications, and improvements may readily occur to those skilled in the art. Such alterations, modifications, and improvements are intended to be within the spirit and scope of the invention. Accordingly, the foregoing description and drawings are by way of example only.

Various changes may be made to the illustrative structures shown and described herein. As a specific example of a possible variation, lossy material is described only in a daughter card connector. Lossy material may alternatively or additionally be incorporated into either connector of a mating pair of connectors. That lossy material may be attached to ground conductors or shields, such as the shields in backplane connector 104.

As an example of another variation, the connector may be configured for a frequency range of interest, which may depend on the operating parameters of the system in which such a connector is used, but may generally have an upper limit between about 15 GHz and 224 GHz, such as 25 GHz, 30 GHz, 40 GHz, 56 GHz, 112 GHz, or 224 GHz, although higher frequencies or lower frequencies may be of interest in some applications. Some connector designs may have frequency ranges of interest that span only a portion of this range, such as 1 to 10 GHz or 5 to 35 GHz or 56 to 112 GHz.

The operating frequency range for an interconnection system may be determined based on the range of frequencies that can pass through the interconnection with acceptable signal integrity. Signal integrity may be measured in terms of a number of criteria that depend on the application for which an interconnection system is designed. Some of these criteria may relate to the propagation of the signal along a single-ended signal path, a differential signal path, a hollow waveguide, or any other type of signal path. Two examples of such criteria are the attenuation of a signal along a signal path or the reflection of a signal from a signal path.

Other criteria may relate to interaction of multiple distinct signal paths. Such criteria may include, for example, near end cross talk, defined as the portion of a signal injected on one signal path at one end of the interconnection system that is measurable at any other signal path on the same end of the interconnection system. Another such criterion may be far end cross talk, defined as the portion of a signal injected on one signal path at one end of the interconnection system that is measurable at any other signal path on the other end of the interconnection system.

As specific examples, it could be required that signal path attenuation be no more than 3 dB power loss, reflected power ratio be no greater than −20 dB, and individual signal path to signal path crosstalk contributions be no greater than −50 dB. Because these characteristics are frequency dependent, the operating range of an interconnection system is defined as the range of frequencies over which the specified criteria are met.

Designs of an electrical connector are described herein that improve signal integrity for high frequency signals, such as at frequencies in the GHz range, including up to about 25 GHz or up to about 40 GHz, up to about 56 GHz or up to about 60 GHz or up to about 75 GHz or up to about 112 GHz or higher, while maintaining high density, such as with a spacing between adjacent mating contacts on the order of 3 mm or less, including center-to-center spacing between adjacent contacts in a column of between 1 mm and 2.5 mm or between 2 mm and 2.5 mm, for example. Spacing between columns of mating contact portions may be similar, although there is no requirement that the spacing between all mating contacts in a connector be the same.

Manufacturing techniques may also be varied. For example, embodiments are described in which the rear housing of connector 200 includes an integrally formed surface at the mounting face of the connector that may serve as an organizer for the mounting ends of a plurality of wafers inserted into the housing. In some embodiments, the mounting face of the connector may be fully or partially open. In those embodiments, a separate organizer may be used.

As another example, an embodiment was illustrated in which a connection was formed between a conductive material of a core member and one leadframe shield. In other embodiments, a core shield may connect to a shield of each leadframe assembly aligned with that core member.

Connector manufacturing techniques were described using specific connector configurations as examples. A right angle connector, suitable for mounting on printed circuit board in an orthogonal system configuration, were illustrated for example. The techniques described herein for forming mating and mounting interfaces of connectors are applicable to connectors in other configurations, such as backplane connectors, cable connectors, stacking connectors, mezzanine connectors, I/O connectors, chip sockets, etc.

In some embodiments, contact tails were illustrated as press fit "eye of the needle" compliant sections that are designed to fit within vias of printed circuit boards. However, other configurations may also be used, such as surface mount elements, solderable pins, etc., as aspects of the present disclosure are not limited to the use of any particular mechanism for attaching connectors to printed circuit boards.

Further, connector features were described, for simplicity of explanation, as upward or downward. Such orientations need not be referenced to gravity or other fixed coordinate system and may indicate relative position or orientation. In some scenarios, upward or downward may be relative to a mounting face of the connector, configured for mounting against a printed circuit board. Similarly, terms such as horizontal or vertical may define relative orientation and, in some scenarios, may indicate orientation relative to a face of the connector configure for mounting against a printed circuit board. Likewise, some connector features were described as forward, or front, or the like. Other connector features were described as rearward, or back, or the like. These terms too, are relative terms, not fixed to any orientation in a fixed coordinate system. In some scenarios, these terms may be relative to a mating face of the connector, with the mating face being at the front of the connector.

Further, a linear array of conductive elements extending parallel to a face of the connector configured for mounting against a printed circuit board were referred to as rows of the connector. Columns were defined to be orthogonal to the row direction. In a mounting interface, a linear array of vias extending perpendicular to an edge of a printed circuit board to which a connector is intended to be mounted are referred to as columns, whereas a linear array parallel to the edge was referred to as a row. It should be appreciated, however, that these terms signify relative orientation and may refer to linear arrays extending in other directions.

The present disclosure is not limited to the details of construction or the arrangements of components set forth in the foregoing description and/or the drawings. Various embodiments are provided solely for purposes of illustration, and the concepts described herein are capable of being practiced or carried out in other ways. Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

What is claimed is:

1. A lead assembly comprising:

a plurality of conductive elements, each of the plurality of conductive element comprising a mating end, a mounting end opposite the mating end, and an intermediate portion extending between the mating end and the mounting end, the mating ends of the plurality of conductive elements aligned in a first row, the mounting ends of the plurality of conductive elements aligned in a second row parallel to the first row, wherein the intermediate portions of the plurality of conductive elements are bent so as to provide first segments parallel to the mating ends and second segments parallel to the mounting ends;

an assembly housing holding the intermediate portions of the plurality of conductive elements, the assembly housing comprising a first portion holding the first segments of the plurality of conductive elements and comprising a first plurality of projections, and a second portion holding the second segments of the plurality of conductive elements and comprising a second plurality of projections; and a shield separated from the plurality of conductive elements by the assembly housing, the shield comprising:

a first plurality of openings having the first plurality of projections extending therethrough;

a second plurality of openings having the second plurality of projections extending therethrough;

a plurality of mating ends aligned in the first row; and a plurality of mounting ends aligned in a third row that is parallel to and offset from the second row, wherein:

the second plurality of openings are partially unfilled.

2. The lead assembly of claim 1, wherein:

the first plurality of projections have distal portions that are wider, in at least one direction, than the first plurality of openings; and the second plurality of projections have distal portions that are wider, in at least one direction, than the second plurality of openings.

3. The lead assembly of claim 1, wherein:

the first plurality of openings are circular, and the second plurality of openings are elongated.

4. The lead assembly of claim 1, wherein:

the first plurality of projections have a same size of the second plurality of projections, and the first plurality of openings are smaller than the second plurality of openings.

5. The lead assembly of claim 1, wherein:

the first plurality of projections are disposed in rows parallel to the first row and columns perpendicular to the first row.

6. The lead assembly of claim 5, wherein:

the first portion of the assembly housing comprises a plurality of first openings that separate the first plurality of projections in the rows.

7. The lead assembly of claim 6, wherein:

the first portion of the assembly housing comprises a plurality of second openings disposed in rows parallel to the first row and offset from the rows of the first plurality of projections.

8. The lead assembly of claim 7, wherein:

portions of the intermediate portions of the plurality of conductive elements are exposed through the plurality of first openings and the plurality of second openings, and the exposed portions of the intermediate portions of the plurality of conductive elements are wider than unexposed portions of the intermediate portions of the plurality of conductive elements.

9. An electrical connector comprising:

a housing; and a plurality of lead assemblies held by the housing, each lead assembly comprising:

a plurality of conductive elements, each of the plurality of conductive elements comprising a mating end, a mounting end opposite the mating ends, and an intermediate portion extending between the mating end and the mounting end, an assembly housing holding the intermediate portions of the plurality of conductive elements and comprising a first plurality of projections and a second plurality of projections, and a shield coupled to the assembly housing and comprising a body comprising:

a first plurality of openings having the first plurality of projections extending therethrough; and a second plurality of openings having the second plurality of projections extending therethrough, wherein:

the first plurality of projections have a same size of the second plurality of projections, the first plurality of openings are smaller than the second plurality of openings, and the first plurality of openings of the body of the shield is closer to the mating ends than the second plurality of openings of the body of the shield.

10. The electrical connector of claim 9, wherein:

the shield comprises a plurality of mating ends aligned in a first row, the mounting ends of the plurality of conductive elements are aligned in a second row, and the shield comprises a plurality of mounting ends aligned in a third row that is parallel to and offset from the second row.

11. The electrical connector of claim 9, wherein:

the first plurality of projections and the second plurality of projections of the assembly housing have distal portions that are wider, in at least one direction, than the plurality of openings of the shield.

12. The electrical connector of claim 9, wherein:

the first plurality of openings of the body of the shield comprise a width in a row direction and a first length in a direction perpendicular to the row direction, the second plurality of openings of the body of the shield comprise the width in the row direction and a second length in the direction perpendicular to the row direction, and the second length is longer than the first length.

13. The electrical connector of claim 9, wherein:

the assembly housing comprises a plurality of openings having portions of the intermediate portions of the plurality of conductive elements exposed therethrough, and the exposed portions of the intermediate portions of the plurality of conductive elements exposed therethrough are wider than unexposed portions of the intermediate portions of the plurality of conductive elements.

14. The electrical connector of claim 9, wherein, for each lead assembly:

the assembly housing comprises a first portion holding first segments of the plurality of conductive elements and a second portion holding second segments of the plurality of conductive elements, the first portion of the assembly housing comprises the first plurality of projections, and the second portion of the assembly housing comprises the second plurality of projections.

15. The electrical connector of claim 14, wherein:

the second portion of the assembly housing comprises a plurality of members, and the shield comprises a third plurality of openings receiving the plurality of members of the second portion of the assembly housing.

16. The electrical connector of claim 14, wherein:

the first plurality of openings of the body of the shield is filled by the first plurality of projections, and the second plurality of openings of the body of the shield is partially unfilled.

17. A method of manufacturing a lead assembly that comprises a plurality of conductive elements each comprising a mating end, a mounting end opposite the mating ends, and an intermediate portion extending between the mating end and the mounting end, and an assembly housing holding the intermediate portions of the plurality of conductive elements, the method comprising:

inserting a first plurality of projections extending from the assembly housing into a first plurality of openings of a shield;

moving the shield such that the first plurality of projections slide in the first plurality of openings of the shield until a second plurality of projections extending from the assembly housing enter a second plurality of openings of the shield; and deforming the first plurality of projections and the second plurality of projections to mechanically lock the assembly housing and the shield together.

18. The method of claim 17, comprising:

overmolding the plurality of conductive elements to form the assembly housing; and severing tie bars connecting the plurality of conductive elements.

19. The method of claim 17, wherein:

the assembly housing comprises first and second portions separate by an opening exposing portions of the intermediate portions of the plurality of conductive elements, and the method comprises bending the exposed portions of intermediate portions of the plurality of conductive elements.

20. The method of claim 17, wherein:

deforming the first plurality of projections and the second plurality of projections comprises heat staking the first plurality of projections and the second plurality of projections.

* * * * *